United States Patent [19]

Scott et al.

[11] 4,325,643
[45] Apr. 20, 1982

[54] FOOD-MIXING APPARATUS COMPRISING A DRIVING UNIT AND A SEPARABLE ARM

[75] Inventors: William H. Scott, Lombard; Mohamed K. Wagdy, Des Plaines, both of Ill.

[73] Assignee: Sunbeam Corporation, Chicago, Ill.

[21] Appl. No.: 167,503

[22] Filed: Jul. 11, 1980

[51] Int. Cl.³ .......................................... A47J 43/044
[52] U.S. Cl. .................... 366/200; 366/224; 366/344; 241/101.1
[58] Field of Search ............ 241/101.1, 285 A, 285 B; 366/601, 197, 199, 200, 201, 206, 213, 222, 224, 344; 74/16

[56] References Cited

U.S. PATENT DOCUMENTS

| | | | |
|---|---|---|---|
| D. 254,948 | 5/1980 | Besford | D7/153 |
| D. 254,949 | 5/1980 | Besford | D7/153 |
| D. 254,950 | 5/1980 | Besford | D7/153 |
| 1,445,112 | 2/1923 | Titus et al. | 366/205 X |
| 2,262,912 | 11/1941 | Behar | 366/200 X |
| 2,278,187 | 3/1942 | Strauss et al. | 366/201 |
| 2,438,465 | 3/1948 | Strauss et al. | 366/200 X |
| 2,562,790 | 7/1951 | Houston | 366/200 |
| 2,584,887 | 2/1952 | Laurence | 366/197 |
| 2,586,101 | 2/1952 | Schwaneke | 366/265 |
| 2,615,691 | 10/1952 | Bisley | 366/201 |
| 2,685,435 | 8/1954 | Moore | 366/200 |
| 2,687,284 | 8/1954 | Gerber et al. | 366/200 |
| 2,727,395 | 12/1955 | White | 366/197 X |
| 2,730,901 | 1/1956 | Ripple | 366/197 X |
| 2,795,958 | 6/1957 | Frank | 366/205 X |
| 2,798,700 | 7/1957 | Corbett et al. | 366/200 |
| 2,801,545 | 8/1957 | Schottle | 366/197 X |
| 2,807,447 | 9/1957 | Vaughan | 366/296 |
| 2,917,929 | 12/1959 | Sprague | 366/205 X |
| 3,224,743 | 12/1965 | Freedman et al. | 366/200 |
| 3,333,824 | 8/1967 | Jepson et al. | 366/344 |
| 3,385,117 | 5/1968 | Braun | 74/16 |
| 3,749,373 | 7/1973 | Kemper | 366/199 X |
| 3,892,365 | 7/1975 | Verdun | 366/206 X |
| 3,901,484 | 8/1975 | Ernster | 241/285 R X |
| 3,951,351 | 8/1976 | Ernster et al. | 366/200 X |
| 4,071,789 | 1/1978 | Ernster et al. | 310/50 |
| 4,095,751 | 6/1978 | Artin | 241/37.5 |
| 4,111,372 | 9/1978 | Hicks et al. | 241/37.5 |
| 4,113,188 | 9/1978 | Belinkoff | 241/37.5 |
| 4,153,210 | 5/1979 | Schaeffer | 241/282.1 |
| 4,174,073 | 11/1979 | Maher et al. | 241/36 |

FOREIGN PATENT DOCUMENTS

| | | |
|---|---|---|
| 151296 | 5/1950 | Australia . |
| 2177876 | 3/1973 | France . |
| 831182 | 7/1958 | United Kingdom . |
| 873684 | 5/1960 | United Kingdom . |

Primary Examiner—Philip R. Coe
Attorney, Agent, or Firm—George R. Clark; Neil M. Rose; Allen J. Hoover

[57] ABSTRACT

In food-mixing apparatus comprising a driving unit and an arm, a latching and pivoting mechanism is adapted to be latched automatically so as to prevent relative movement of the arm and a console of the driving unit upon pivotal movement of the arm either to a lowered position or a raised position, and so as to prevent relative movement of the arm and the console, except for pivotal movement of the arm, upon pivotal movement of the arm to a pivotal position therebetween. The mechanism is adapted to be unlatched manually so as to permit pivotal movement of the arm from any pivotal position, and so as to permit the arm to be removed from the console upon further movement of the arm from the raised position.

16 Claims, 24 Drawing Figures

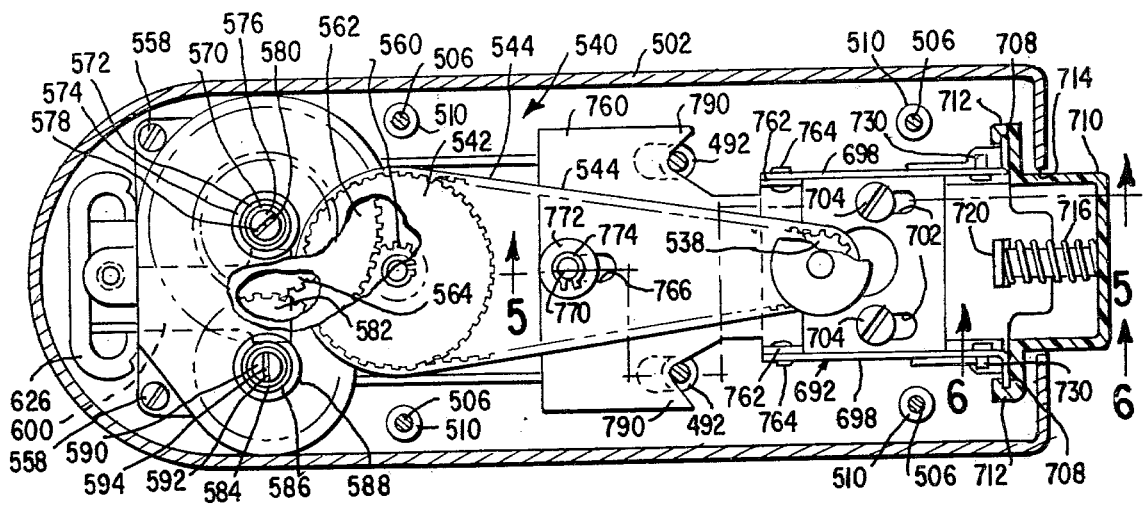
FIG. 4
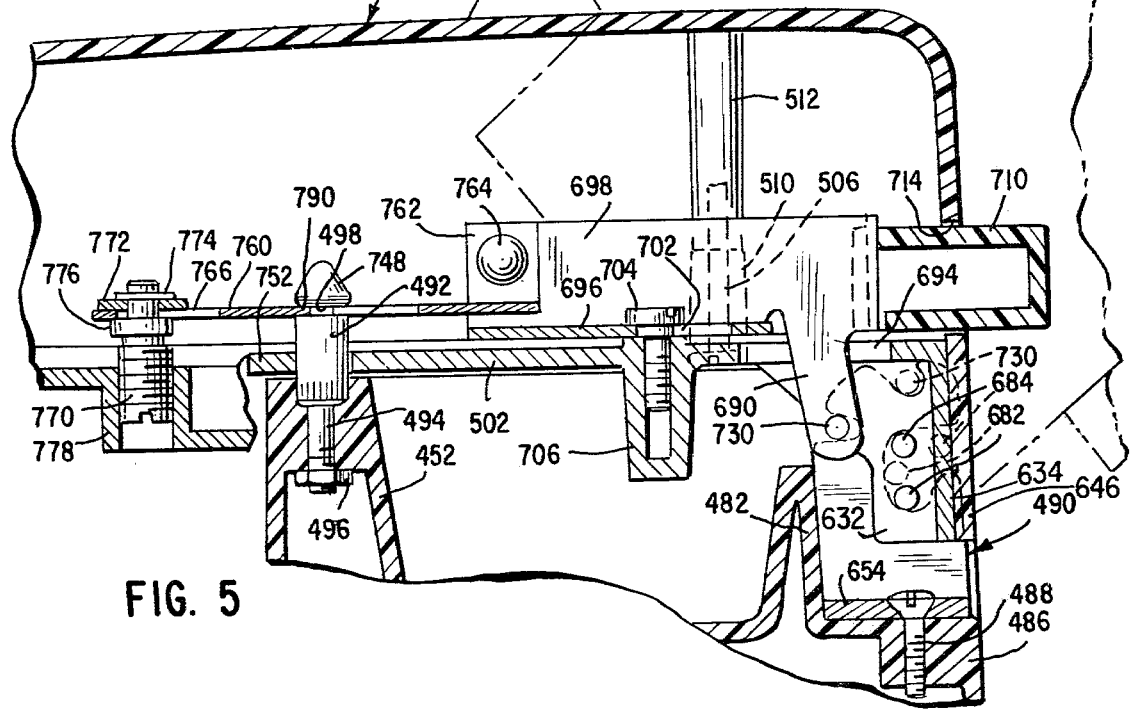
FIG. 6
FIG. 5

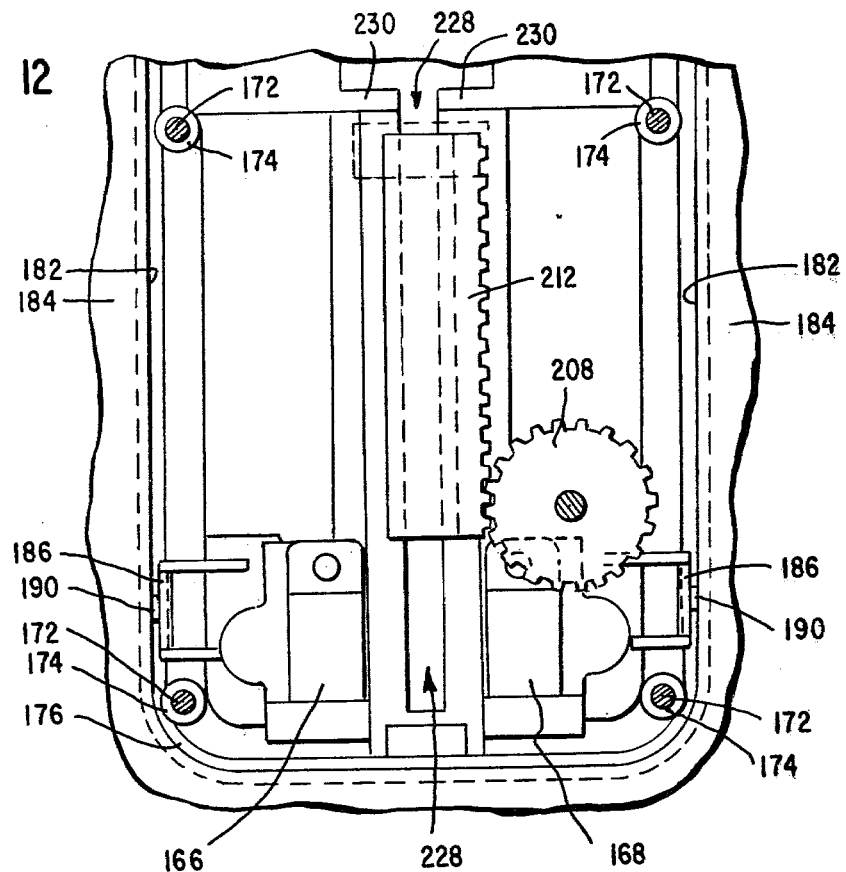
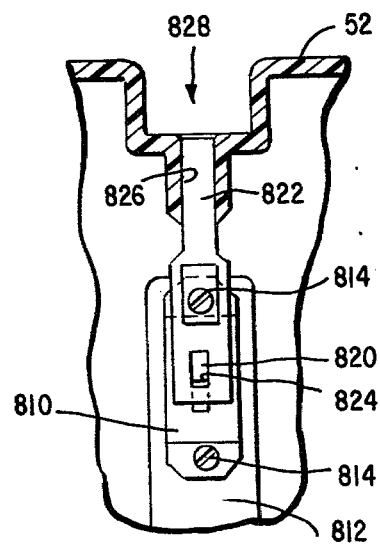

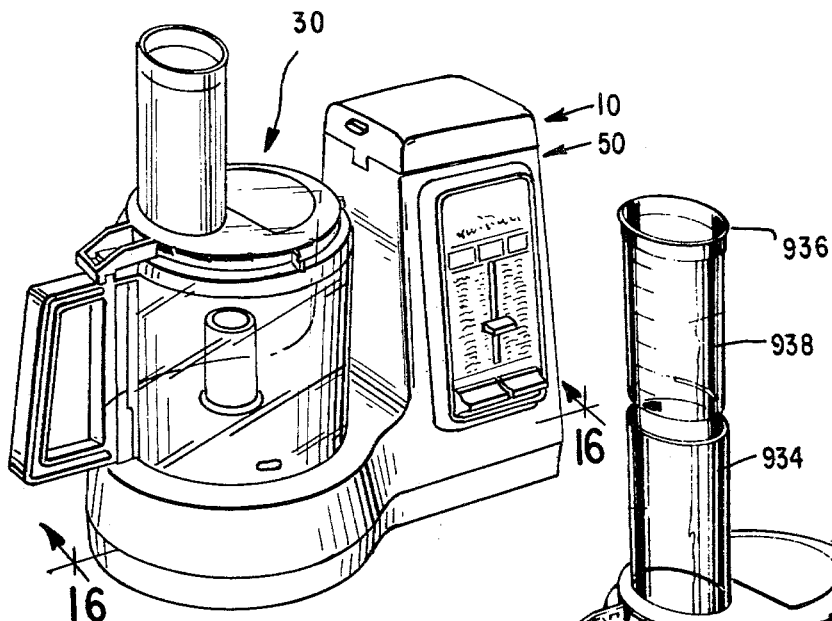
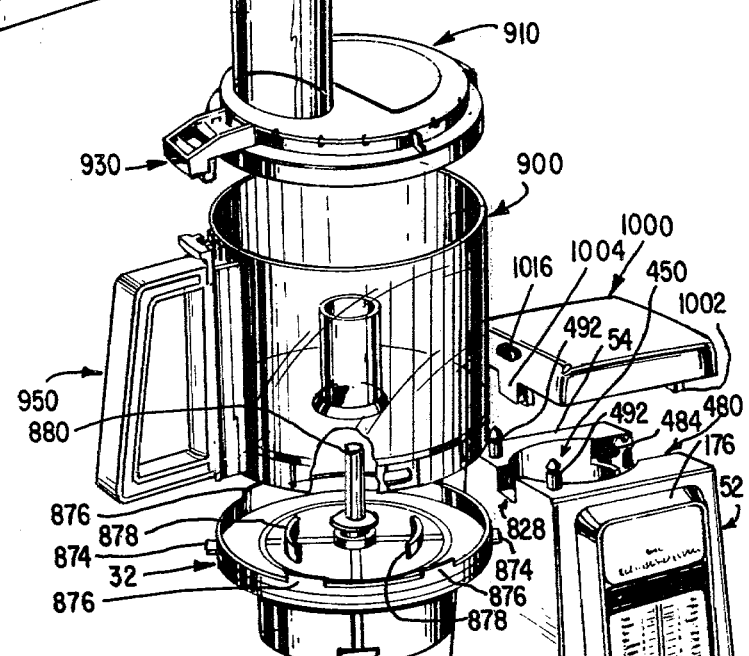
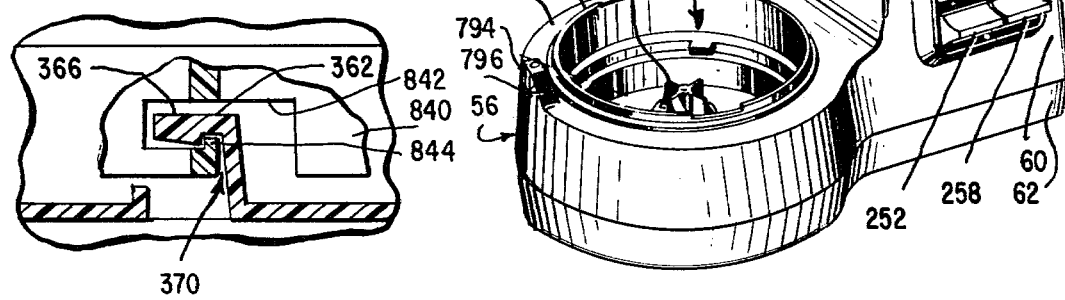

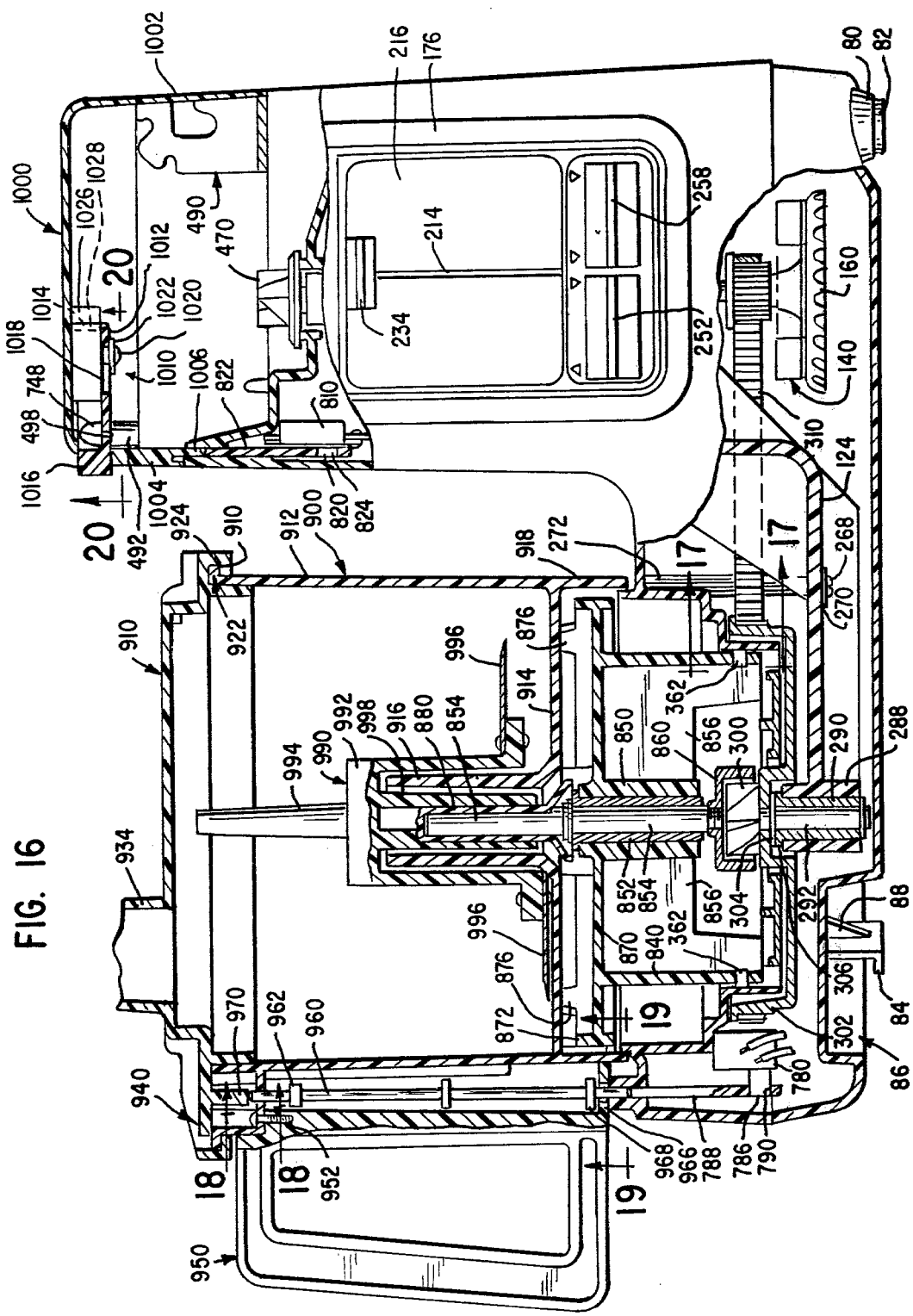

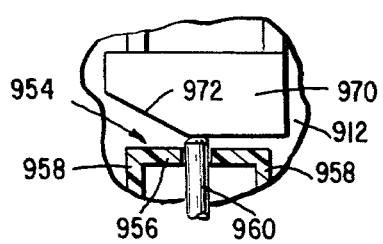
FIG. 18
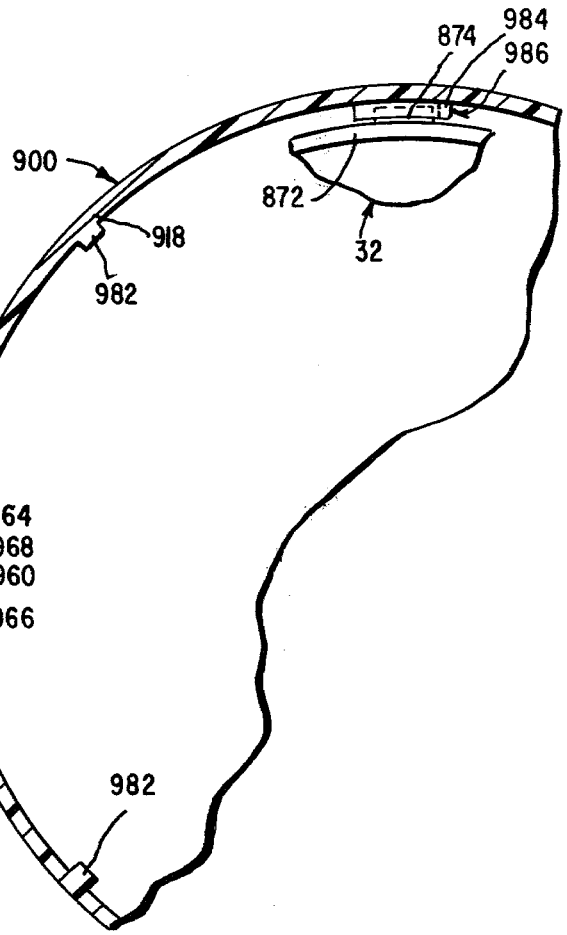
FIG. 19
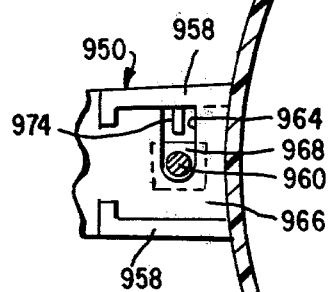
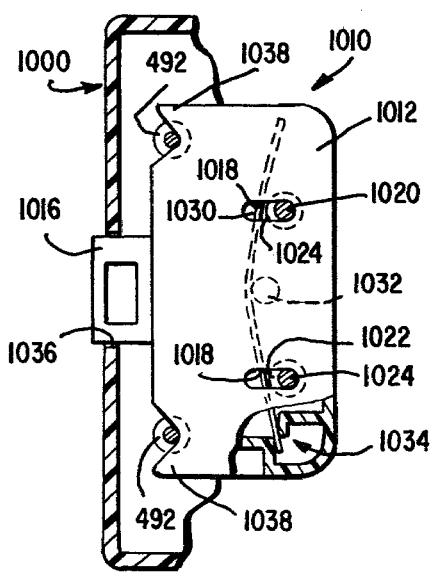
FIG. 20

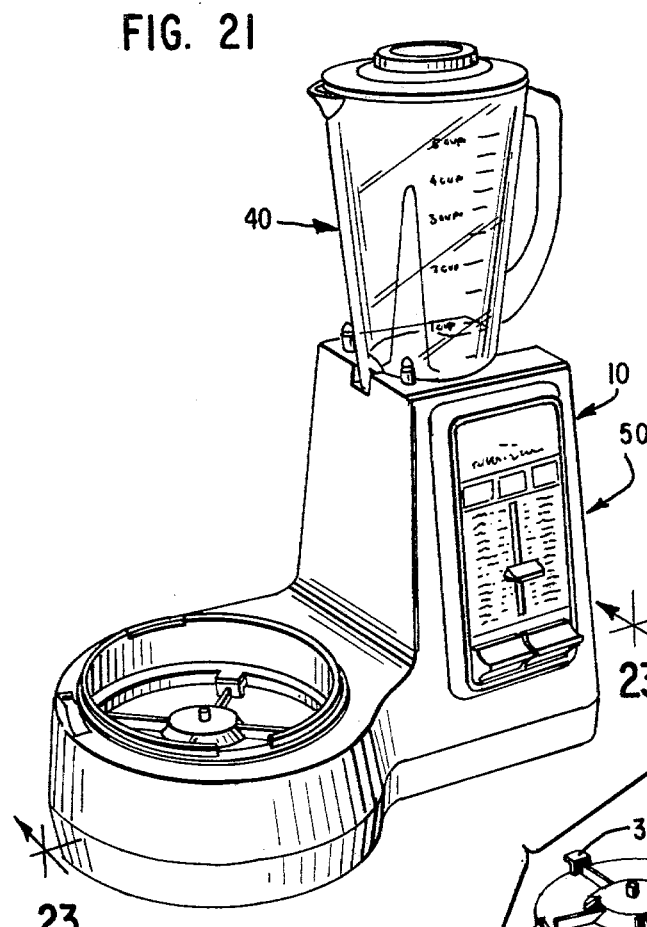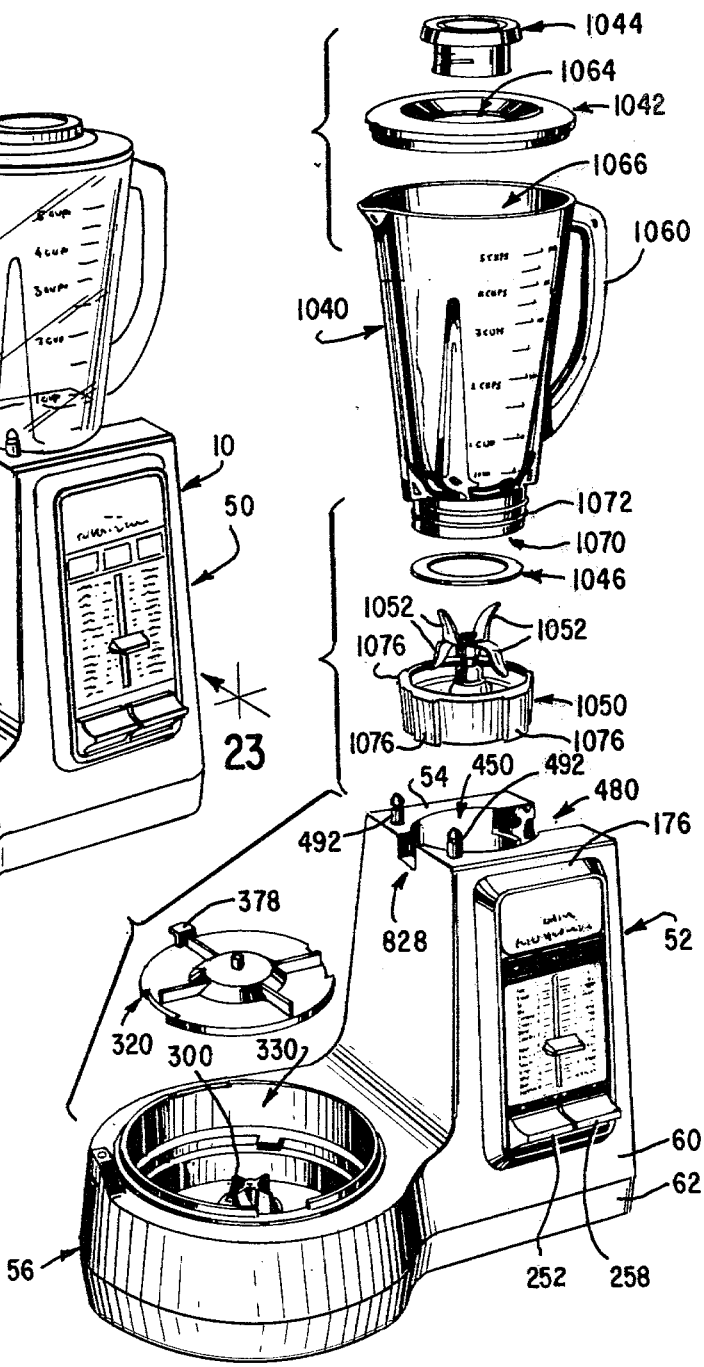

FOOD-MIXING APPARATUS COMPRISING A DRIVING UNIT AND A SEPARABLE ARM

BACKGROUND OF THE INVENTION

1. Field of the Invention

This invention pertains to food-mixing apparatus comprising a driving unit and a separable arm.

2. Description of the Prior Art

As exemplified in U.S. Pat. No. 3,333,824, it is common for a food mixer of a first type to comprise a base, which supports a mixing bowl on a transverse portion of the base, an arm, which is mounted pivotally to an upright portion of the base, for pivotal movement between a lowered position, wherein the arm extends transversely over the mixing bowl, and a raised position, and which supports a mixing tool mounted operatively to the arm so as to extend the mixing tool into the mixing bowl upon pivotal movement of the arm to the lowered position. The driving unit also comprises a motor, which is carried by the arm, and a power train, which also is carried by the arm, and which couples the motor to the mixing tool.

Significant improvements in a food mixer of the first type are disclosed in a co-pending patent application now U.S. Pat. No. 4,277,181 which was filed Apr. 26, 1979, under U.S. Ser. No. 33,584, by Daniel C. Stahley, William H. Scott, and Mohamed K. Wagdy for Food Mixer, and which is assigned commonly herewith.

As exemplified in U.S. Pat. No. 4,071,789, U.S. Pat. No. 3,951,351, and U.S. Pat. No. 2,438,465 it is known for a food mixer of a second type to comprise a driving unit, a mixing bowl, and a separable arm. The driving unit comprises a console, which supports a mixing bowl on a transverse portion of the console, a motor, which is mounted in the console, an arm, which is mounted pivotally to an upright portion of the console, for pivotal movement between a lowered position, wherein the arm extends transversely over the mixing bowl, and a raised position, and which supports a mixing tool mounted operatively to the arm. The driving unit also comprises a power train, which is carried by the arm, and which is coupled to the mixing tool, and a coupler, which couples the motor to the power train upon pivotal movement of the arm to the lowered position, and which uncouples the motor from the power train upon pivotal movement of the arm from the lowered position.

As exemplified in the co-pending patent application noted above, U.S. Pat. No. 4,071,789, and U.S. Pat. No. 3,951,351, it is known for an arm of a food mixer to be latched releasably in a lowered position, whereby the arm cannot pivot upwardly from the lowered position under heavy loads, as may be imparted upwardly on the arm particularly but not exclusively if a pair of interoperative dough hooks of a type disclosed in said co-pending patent application are used as the processing tool.

As exemplified in U.S. Pat. No. 4,071,789 and U.S. Pat. No. 3,951,351, it is known for an arm of a food mixer to be removable from a driving unit of the food mixer, whereby the driving unit can be combined selectively with the food mixer, a food blender, or a food grinder.

SUMMARY OF THE INVENTION

This invention provides an improvement in food-mixing apparatus comprising a console, which is adapted to support a mixing bowl on a transverse portion of the console, a motor, which is mounted in the console, an arm, which is adapted to be mounted pivotally to an upright portion of the console, for pivotal movement through positions including a lowered position, wherein the arm extends transversely over the mixing bowl supported on the transverse portion of the console, and a raised position, and which is adapted for a mixing tool to be mounted operatively to the arm, a power train, which is carried by the arm so as to be coupled to a mixing bowl mounted operatively to the arm, and a coupler, which is adapted to couple the motor to the power train upon pivotal movement of the arm to the lowered position, and which is adapted to uncouple the motor from the power train upon pivotal movement of the arm from the lowered position.

According to the improvement, the apparatus comprises a latching and pivoting mechanism, which is adapted to be latched automatically so as to prevent relative movement of the arm and the console upon pivotal movement of the arm either to the lowered position or to the raised position, and so as to prevent relative movement of the arm and the console, except for pivotal movement of the arm, upon pivotal movement of the arm to a pivotal position between the lowered position and the raised position, and which is adapted to be unlatched manually so as to permit pivotal movement of the arm from any pivotal position, and so as to permit the arm to be removed from the console upon further movement of the arm from the raised position, in a sense opposite to pivotal movement of the arm from the raised position toward the lowered position.

In a preferred construction, a flanged portion of the arm fits into a recess in the upright portion of the console when the arm is mounted pivotally to the upright portion of the console, and the latching and pivoting mechanism comprises parallel ways, which are provided on opposite sies of the recess, and parallel pivots, which extend laterally from the flanged portion of the arm into respective ones of the ways when the arm is mounted pivotally to the upright portion of the console. Each of the ways has a mouth, through which one of the pivots can pass, an upper, horizontal edge, an inner, vertical edge, and a lower, cupped edge defining a cup, within which one of the pivots is disposed upon pivotal movement of the arm to the lowered position.

In the preferred construction, the latching and pivoting mechanism comprises a pair of similar links, which depend from the arm when the arm is disposed in the lowered position, which are movable along the arm in a locking direction and unlocking direction, and which are biased in the locking direction. Also, the locking and pivoting mechanism coprises a pair of similar pins, which extend laterally from respective ones of the links. The recess is provided on each side with a lower notch and an upper notch. The lower notches are disposed to receive the pins, upon pivotal movement of the arm to the lowered position, so as to prevent pivotal movement of the arm from the lowered position while the pins remain in the lower notches. The upper notches are disposed to receive the pins, upon pivotal movement of the arm to the raised position, so as to prevent pivotal movement of the arm from the raised position while the pins remain in the upper notches.

In the preferred construction, the latching and pivoting mechanism also comprises a pair of similar posts, which extend upwardly from the upright portion of the console, so as to extend into the arm when the arm is disposed in the lowered position, and which have respective notches, and a latching plate, which is movable conjointly with the links, and which has respective hooked portions adapted to be engaged in the notches of the posts, upon pivotal movement of the arm to the lowered position, so as to prevent pivotal movement of the arm from the lowered position.

Preferably, the latching and pivoting mechanism comprises a button, which is mounted operatively to the arm, which is biased outwardly, and which is linked to the latching plate and the links so as to unlatch the latching and pivoting mechanism when the button is pushed inwardly. Preferably, the ways and the lower and upper notches are defined by slotted portions of vertical plates being integral parts of a bracket, which is disposed in the recess. Preferably, each pivot comprises a pair of parallel pins, each extending laterally from the flanged portion of the arm, one pin of each pivot being disposed above another pin of such pivot upon pivotal movement of the arm to the lowered position.

BRIEF DESCRIPTION OF THE DRAWINGS

As shown in FIG. 1, a mixing bowl and two mixing beaters are omitted from FIG. 2.

FIG. 4 is a sectional view on a horizontal section, which is taken approximately along line 4—4 of FIG. 3 in a direction indicated by arrows.

FIG. 5 is a fragmentary section, which is taken approximately along line 5—5 of FIG. 4 in a direction indicated by arrows, on a further enlarged scale compared to FIG. 3. In FIG. 5, a portion of an arm of the food mixer is shown in a lowered position in full lines, and in a changed position in phantom lines. FIG. 6 is a detailed view, which is taken along line 6—6 of FIG. 4 in a direction indicated by arrows. FIG. 6 shows one slotted portion of a bracket, another slotted portion of which appears in FIG. 5.

In FIG. 7, a bottom portion of a console of the driving unit has been removed, except for a fragmentary part of the bottom portion.

FIG. 8 shows a fragmentary portion of the driving unit and the lower cover. In FIG. 8, the bearing ring, the turntable, and the mixing bowl have been removed.

FIG. 11 shows a fragmentary portion of the arm of the food mixer.

FIG. 12 is a sectional view, which is taken approximately along line 12—12 of FIG. 11 in a direction indicated by arrows. FIG. 12 shows certain manual controls and a fragmentary portion of one wall of the console of the driving unit.

FIG. 13 is a fragmentary section, which is taken along line 13—13 of FIG. 3 in a direction indicated by arrows, on a further enlarged scale compared to FIG. 3. FIG. 13 shows details of an electromechanical switch, which is significant when the driving unit is combined with a food processor, as shown in FIG. 14.

FIG. 14 is a perspective view of an apparatus comprising the driving unit, which is common to the apparatus of FIG. 1, but which is combined in the apparatus of FIG. 14 with a food processor. FIG. 15 is an exploded view of the driving unit, an upper cover for the driving unit, an adapter enabling the food processor to be driven from the driving unit, and the food processor. No processing tool is shown in FIGS. 14 and 15.

FIG. 16 is a vertical section, which is taken approximately along line 16—16 of FIG. 14 in a direction indicated by arrows on a somewhat enlarged scale compared to FIG. 14. FIG. 16 shows a fragmentary portion of the console of the driving unit in perspctive. FIG. 16 also shows a processing tool for the food processor. FIG. 17 is a fragmentary section, which is taken along line 17—17 of FIG. 16 in a direction indicated by arrows, and in a manner analogous to FIG. 8. FIG. 18 is a fragmentary section, which is taken along line 18—18 of FIG. 16 in a direction indicated by arrows. FIG. 19 is a fragmentary section, which is taken along line 19—19 of FIG. 16 in a direction indicated by arrows, on a somewhat enlarged scale compared to FIG. 16. FIG. 20 is a fragmentary section taken along line 20—20 in a direction indicated by arrows, on a somewhat enlarged scale compared to FIG. 16.

FIG. 21 is a perspective view of an apparatus comprising the driving unit, which is common to the apparatus of FIGS. 1 and 14, but which is combined in the apparatus of FIG. 21 with a food blender. FIG. 22 is an exploded view of the driving unit including the lower cover and the food blender.

FIG. 23 shows a fragmentary portion of the blender and a fragmentary portion of the console of the driving unit, in perspective.

DETAILED DESCRIPTION OF PREFERRED EMBODIMENT

Figures 1, 2:
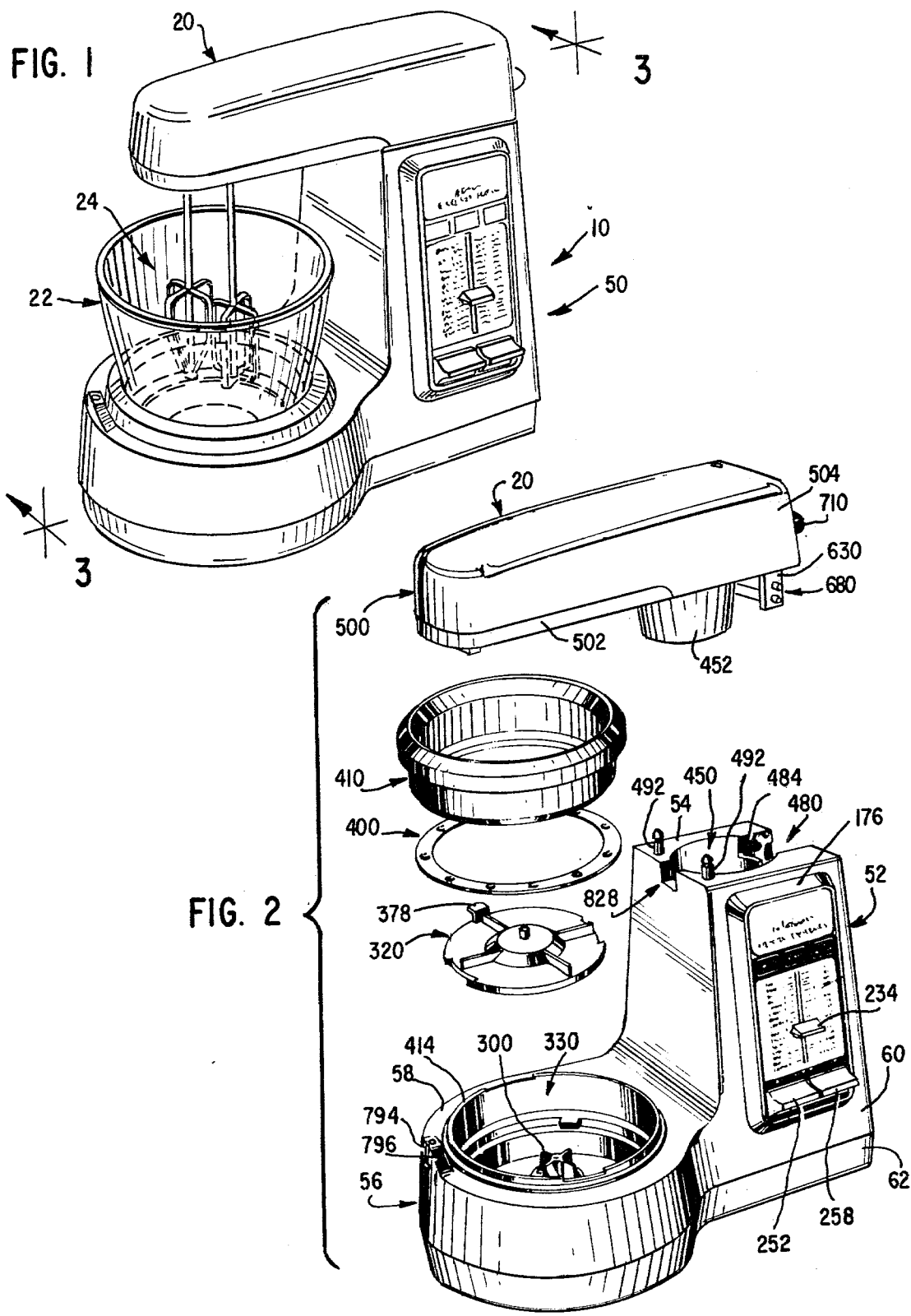
FIG. 1 is a perspective view of an apparatus comprising a driving unit, which may be combined selectively with different driven appliances for processing of food, and which is combined in the apparatus of FIG. 1 with a food mixer.
FIG. 2 is an exploded view of the driving unit including a lower cover, as well as a bearing ring and a turntable, and the food mixer.

As shown in the drawings, a driving unit 10, which has various novel features described hereinafter, may be combined selectively with various driven appliances for processing of food, in various novel combinations described hereinafter.

Figure 23:
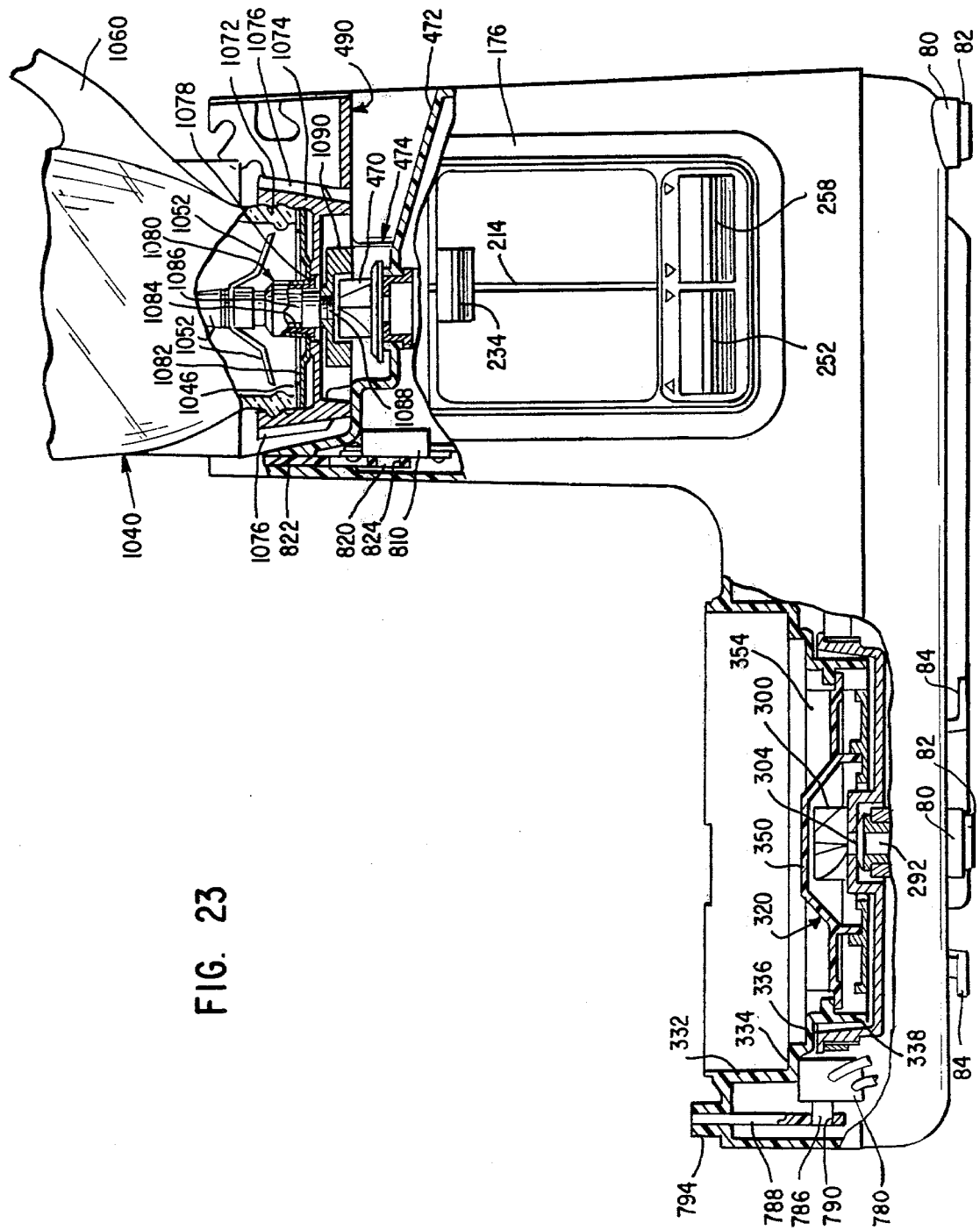
FIG. 23 is a vertical section, which is taken approximately along line 23—23 of FIG. 21 in a direction indicated by arrows, on a somewhat enlarged scale compared to FIG. 21.

As shown in FIGS. 1 through 13, the driving unit 10 may be combined with a food mixer 20, which is similar in some ways to known food mixers driven from separable driving units, but which has various novel features described hereinafter. As shown in FIG. 1, a mixing bowl 22 and a processing tool, as exemplified by a pair of interoperative mixing beaters 24, are used with the food mixer 20. As shown in FIGS. 14 through 20, the driving unit 10 may be combined with a food processor 30, which is similar to known food processors driven from separable driving units, but which is mounted to the driving unit 10 by a special adapter 32 described hereinafter. As shown in FIGS. 27 through 23, the driving unit 10 may be combined with a food blender 40, which is similar to known food blenders driven from separable driving units.

Initially, a combination comprising the driving unit 10 and the food mixer 20 is described hereinafter. Subsequently, a combination comprising the driving unit 10 and the food processor 30 is described hereinafter. Finally, a combination comprising the driving unit 10 and the food blender 40 is described hereinafter. The driving unit 10, the food mixer 20, the mixing bowl 22, the mixing beaters 24, the food processor 30, the special adapter 32, the food blender 40, and suitable processing tools besides the mixing beaters constitute a multi-purpose food-processing apparatus, which is convenient to assemble, operate, and disassemble in the combinations noted above, and which makes efficient use of limited space available for food-processing appliances in many kitchens.

As shown in FIG. 1 and elsewhere in the drawings, the driving unit 10 comprises a console 50, which is adapted to rest on a horizontal surface. The console 50 has an upright, pyramidal portion 52, which provides an upper platform 54, and a transverse, broadened portion 56, which is juxtaposed to the pyramidal portion 52, and which provides a lower platform 58. As shown in FIGS. 1 and 2, the transverse, broadened portion 56 of the console 50 is offset forwardly, for a purpose described hereinafter.

Figure 7:
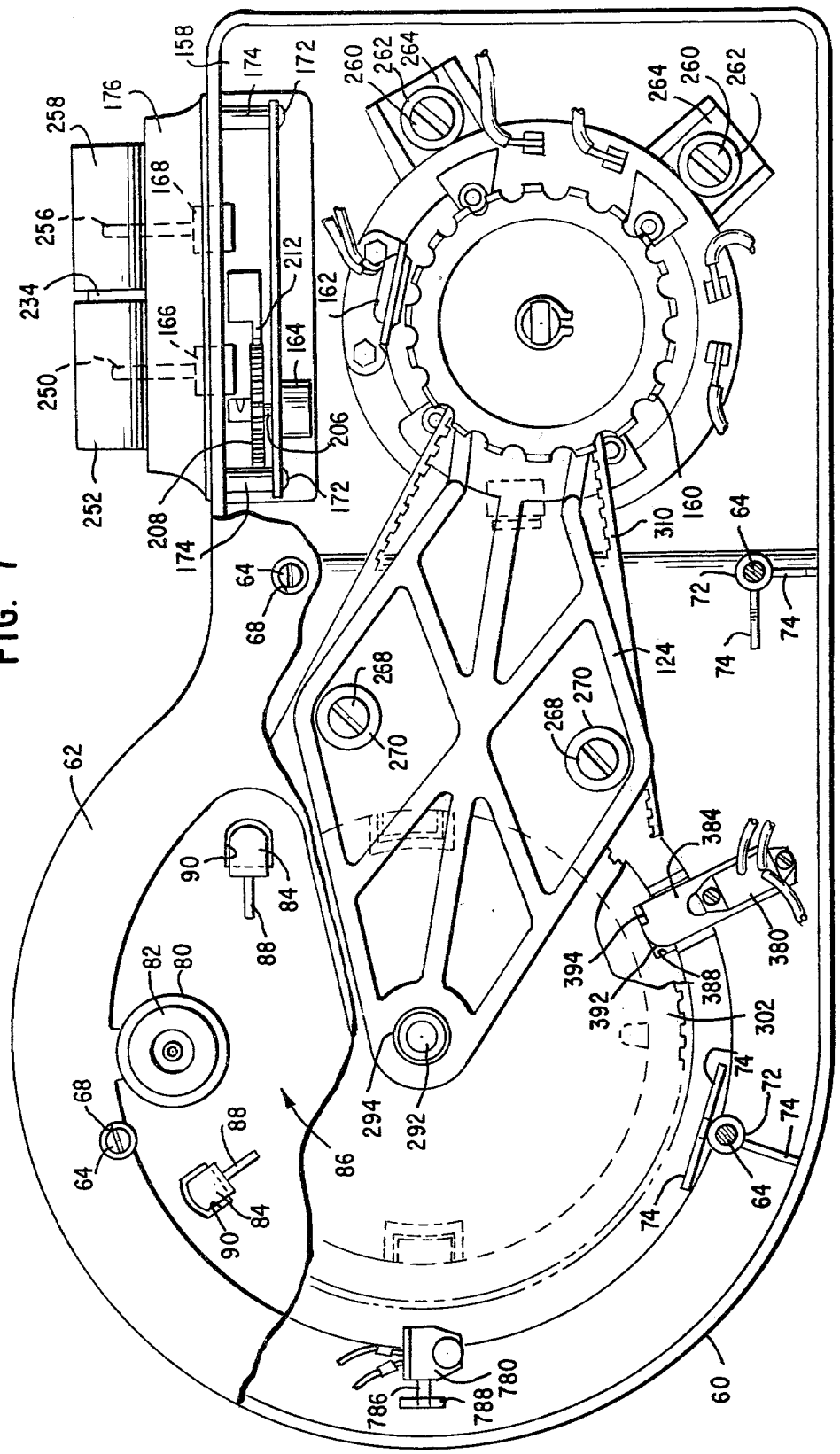
FIG. 7 is a horizontal view, which is taken approximately along line 7—7 of FIG. 3 in a direction indicated by arrows, on a further enlarged scale compared to FIG. 3.

The console 50 comprises an upper shell 60 and a lower shell 62. The upper shell 60 and the lower shell 62 are fabricated of suitable molded plastic, which enables the driving unit 10 to be double-insulated electrically. As shown in FIG. 7, the upper shell 60 and the lower shell 62 are fastened together by four screws 64, which pass upwardly through respective apertures in recessed pockets 68 in the lower shell 62 into respective sockets in integral posts 72. The posts, which project downwardly in the upper shell 60, are reinforced by integral webs 74.

Figure 3:
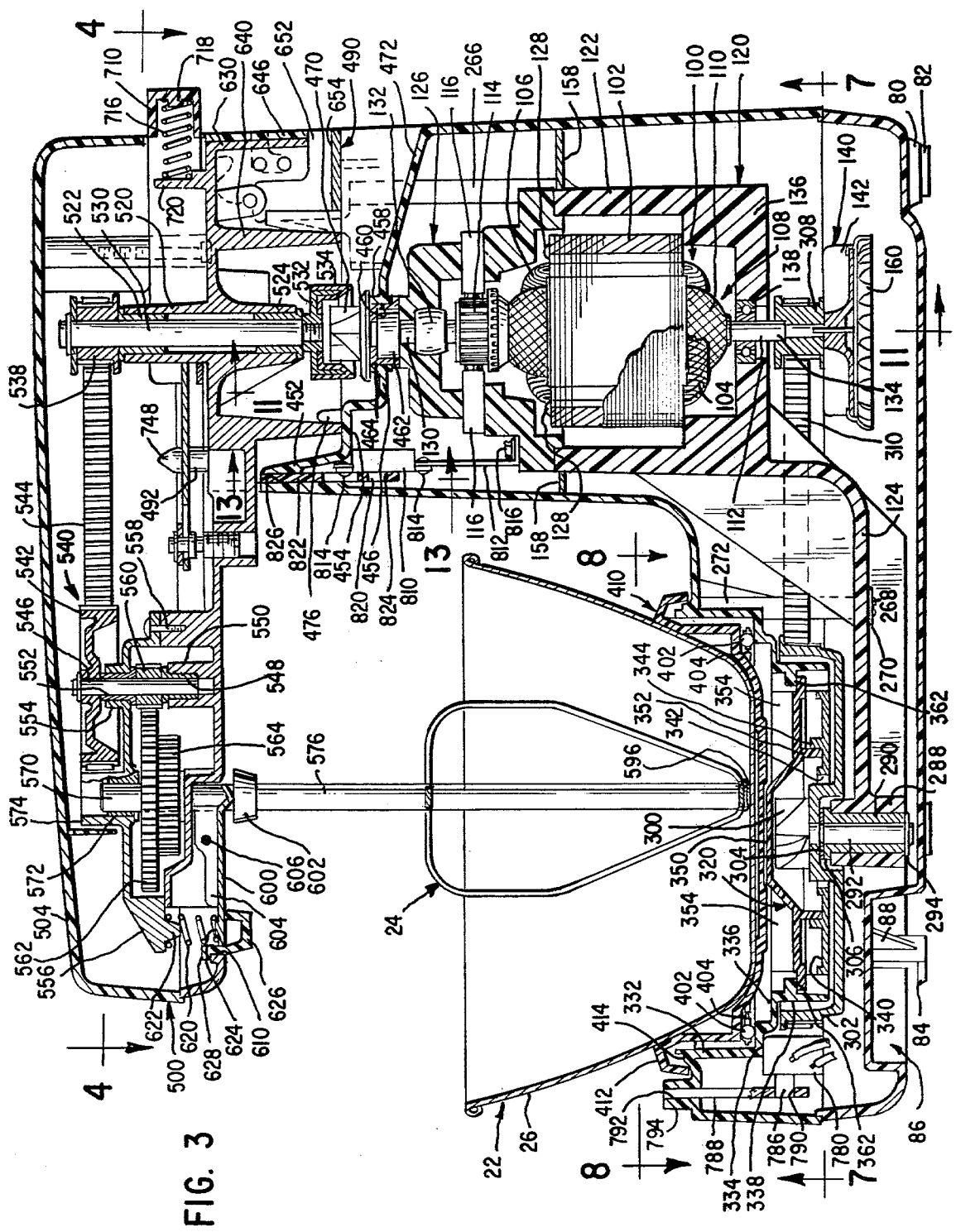
FIG. 3 is a vertical section, which is taken approximately along line 3—3 of FIG. 1 in a direction indicated by arrows, on a somewhat enlarged scale compared to FIG. 1.
Figure 11:
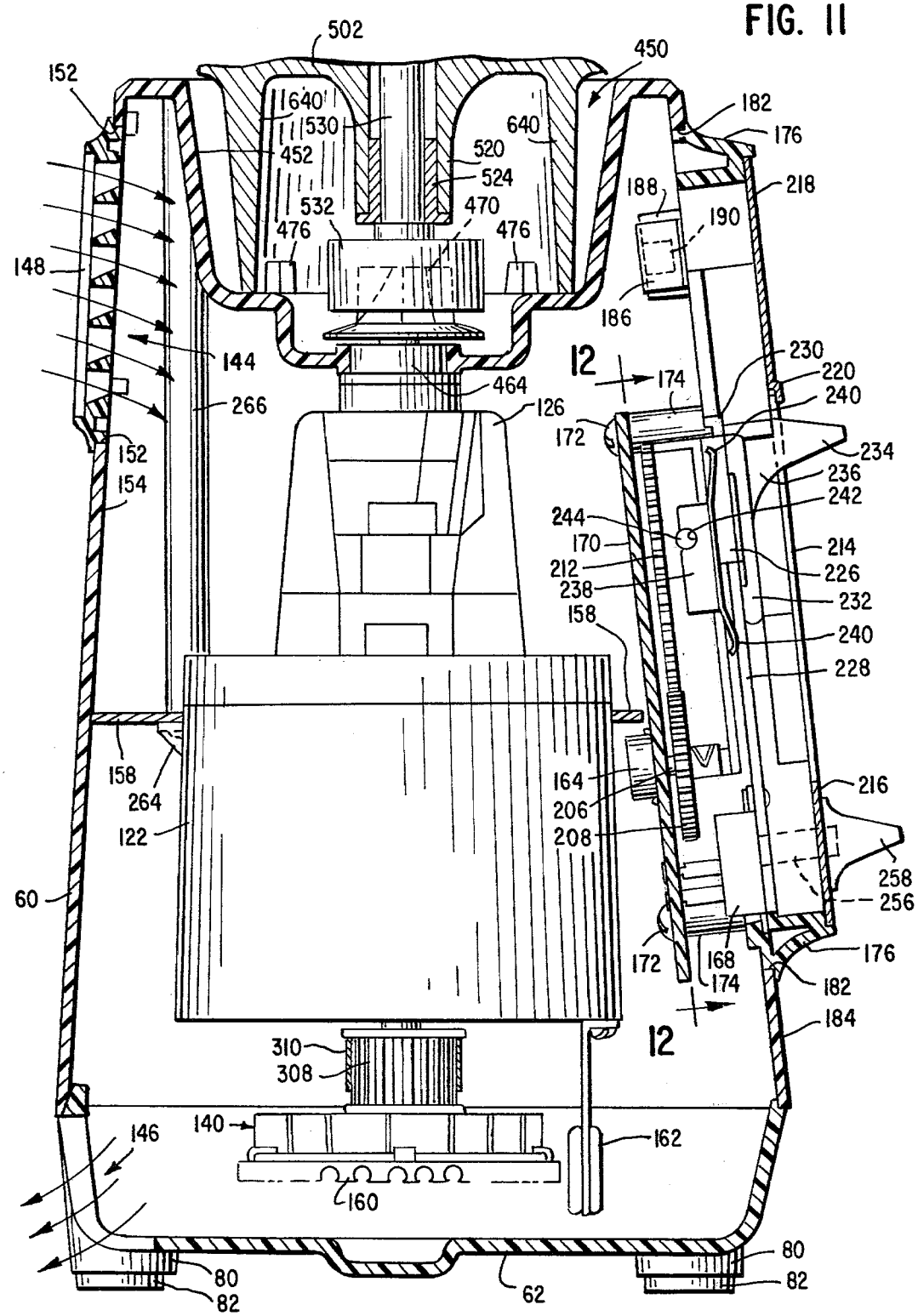
FIG. 11 is a vertical section, which is taken approximately along line 11—11 of FIG. 3 in a direction indicatec by arrows, on a further enlarged scale compared to FIG. 3.

As shown in FIGS. 3, 7, and 11, the lower shell 62 is fabricated with integral legs 80, which have respective non-skidding and non-marring feet 82 attached suitably to the legs 80 and made of suitable resilient material. Alternatively, the legs 80 may have respective suction cups (not shown) rather than the feet 82. The console 50 is provided with four such legs for effective distribution of its weight.

As shown in FIGS. 3 and 7, the lower shell 62 is fabricated with integral hooks 84, which project downwardly in a recessed channel 86 formed in the lower shell 62 and shaped as a horseshoe, and which are reinforced with integral webs 88. The console 50 is provided with four such hooks, so as to enable an electrical cord (not shown) to be wound around the hooks 84 and to be confined within the recessed channel 86, for compact storage of the cord when the apparatus is stored, and for take-up of excess length of the cord. At each hook 84, the lower shell 62 is provided with an aperture 90, which enables spillage from the mixing bowl 22 to drain from the console 50.

Figure 24:
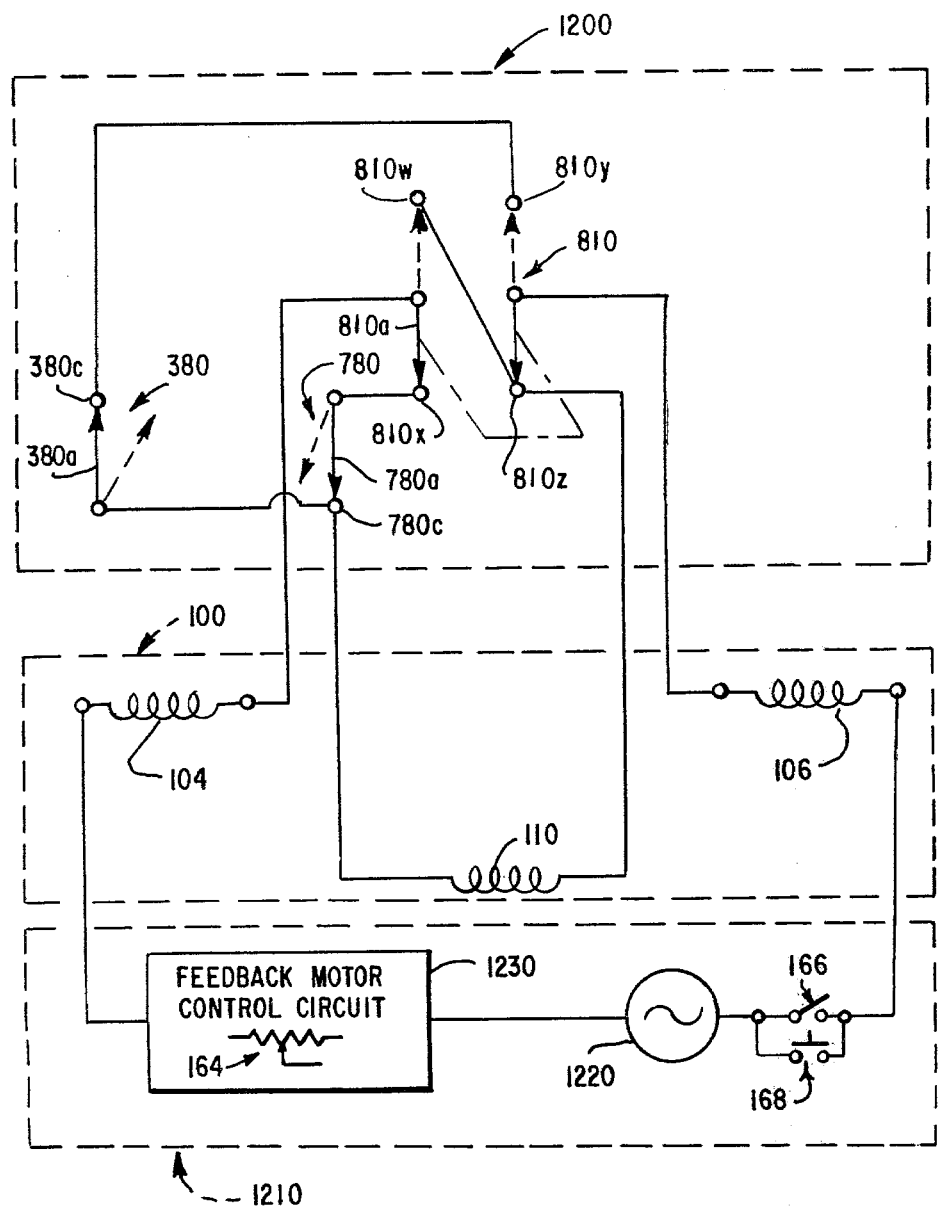
FIG. 24 is a diagram of electrical circuits of the driving unit, which is common to the apparatus of FIGS. 1, 14, and 21.

As shown in FIGS. 3 and 22, and as indicated in FIG. 24, an electric motor 100 is mounted within the console 50. The electric motor 100, which is shown in a simplified, semi-diagrammatic manner in the drawings, is a conventional, reversible, universal, series motor comprising a laminated field 102, which is wound with a field coil 104 and a field coil 106, an armature 108, which is wound with an armature coil 110, and which comprises a shaft 112, a commutator 114, which is carried by the shaft 112 for conjoint rotation with the armature 108, and a pair of brush assemblies 116, which cooperate with the commutator 114. Suitable windings, mountings, and connections of the field and armature coils can be made by a person skilled in the art of electric motors. Relative polarities of the field and armature coils are discussed hereinafter.

The electric motor 100 is supported by a frame 120, which is mounted within the console 50, in a manner described hereinafter, so as to orient the shaft 112 vertically. The frame 120 has a cylindrical portion 122, which encloses the electric motor 100, and which disposes the electric motor 100 within the pyramidal portion 52 of the console 50. The frame 120 has a transverse portion 124, which is integral with the cylindrical portion 122, and which extends transversely from the cylindrical portion 122 into the broadened portion 56 of the console 50. A separate cover 126 is mounted by conventional screws (not shown) onto the cylindrical portion 122.

The laminated field 102 is mounted by conventional screws 128 within the cylindrical portion 122 of the frame 120. The pair of brush assemblies 116 are mounted suitably on the separate cover 126 so as to cooperate with the commutator 14. The shaft 112 is journalled at an upper portion 130 to the separate cover 126 by conventional spherical bearing means 132. The shaft 112 is journalled at a lower portion 134 to a lower crosspiece 136 of the cylindrical portion 122 by conventional ball bearing means 138.

Near its lower portion 134, the shaft 112 carries a cooling impeller 140, which has an array of radial vanes 142, and which is adapted to draw air downwardly from a louvered inlet 144 in the pyramidal portion 52 of the console 50, through the electric motor 100, to a louvered outlet 146 beneath the electric motor 100. Advantageously, both the louvered inlet 144 and the louvered outlet 146 are remote from the mixing bowl 22, so as to avoid contamination. The louvered inlet 144 is formed in a separate grill 148, which is mounted in a conventional manner across a rectangular aperture 152 in a back wall 154 of the upper shell 60 in the pyramidal portion 52. The louvered outlet 146 is formed on the lower shell 62. A baffle 158, which may be made of fiberboard, is mounted transversely, in a manner described hereinafter, so as to limit downflow of air outside the electric motor 100. The lower shell 62 may be formed with integral cowls (not shown) which direct air to the louvered outlet 146.

At its lower end, the shaft 112 carries a toothed interrupter wheel 160, which rotates conjointly with the shaft 112 in close proximity to a magnetic pick-up 162 to generate a signal corresponding to rotational speed of the shaft 112, as described in a co-pending patent application which was filed July 1, 1980 under U.S. Ser. No. 167,627, by Robert F. Contri for Feedback Motor Control Circuit, which is assigned commonly herewith. The magnetic pick-up 162 is mounted to and beneath the cylindrical portion 122 of the frame 120. As indicated diagrammatically in FIG. 21, the electric motor 100 is controlled by the feedback motor control circuit disclosed in said co-pending patent application, which is incorporated herein by reference. As described hereinafter, a potentiometer 164, a single-pole, single-throw, on-off switch 166, and a momentary on-off switch 168 are components that also are disclosed diagrammatically in said co-pending application.

As shown in FIGS. 7, 11, and 12, the potentiometer 164 is mounted to a circuit board 170, on which are provided the electronic components (not shown) of the feedback motor control circuit discussed hereinbefore, and which is attached by conventional screws 172 to integral posts 174 on a rectangular frame 176. The rectangular frame 176 is mounted removably over a rectangular aperture 182 formed in a front wall 184 of the pyramidal portion 52 of the console 50. Leaf spring elements 186, which are carried by respective integral fingers 188 on the rectangular frame 176, have respective integral tabs 190, which are adapted to engage respective marginal portions of the front wall 184, so as to enable the rectangular frame 176 to be snap-fitted over the rectangular aperture 182.

The potentiometer 164 comprises a shaft 206, which may be rotated in either direction so as to adjust the potentiometer 164 to differnt resistance, which extends outwardly through an aperture (not shown) in the circuit board 170, and which carries a pinion 208 for conjoint rotation with the shaft 206. A rack 212, which cooperates with the pinion 208, is arranged for longitudinal movement over a vertical range, as defined by a slot 214, which is closed at its lower end, and which is formed in a lower escutcheon 216. The lower escutcheon 216 is fastened adhesively to the rectangular frame 176. An upper escutcheon 218, which has a lower lip 220 overlapping the lower escutcheon 216, is fastened adhesively to the rectangular frame 176 so as to close the slot 214 at its upper end.

An integral extension 226 of the rack 212 extends forwardly through a slot 228, which is defined by opposite integral portions 230 of the rectangular frame 176 and carries integral wing portions 232, which slide against the integral portions 230 of the rectangular frame 176. An external knob 234, which is shown in its uppermost position in FIGS. 11 and 12 and in an intermediate position in FIGS. 2, 15, and 20, is connected integrally to the integral extension 226 by an integral web 236, which extends fowardly through the slot 214, so as to enable a user to position the rack 212 selectively along the slot 228 for selective adjustment of the potentiometer 164 according to indicia borne by the lower escutcheon 216. A spring element 238, which has four spring legs 240 (two shown in FIG. 11) engaging the integral portions 230 defining the slot 228, embraces the integral extension 226 of the rack 212, and has respective notches 242 receiving integral posts 244 on opposite sides of the integral extension 226 of the rack 212, biases the rack 212 backwardly so as to enable the wing portions 232 to hold the rack 212 frictionally in a selected position along the slot 228.

As shown in FIGS. 7, 11, and 12, the switch 166 and the switch 168 are mounted respectively to the rectangular frame 176, in juxtaposition to each other. An actuator 250, which switches the switch 166 to its opened ("off") mode when moved upwardly, and which switches the switch 166 to its closed ("on") mode when moved downwardly, extends forwardly through an aperture (not shown) in the lower escutcheon 216 and carries an external knob 252, by which a user is enabled to operate the switch 166 selectively between its opened and closed modes. An actuator 256, which switches the switch 168 to its opened ("off") mode when moved upwardly, which switches the switch 168 to its closed ("on") mode when moved downwardly, and which is biased upwardly so as to cause the switch 168 to be opened normally, extends forwardly through an aperture (not shown) in the lower escutcheon 216 and carries an external knob 258, which is juxtaposed to the external knob 252, and by which a user is enabled to close the switch 168 momentarily.

As shown in FIGS. 3, 7, and 11, the cylindrical portion 122 of the frame 120 is mounted within the pyramidal portion 52 of the console 50, along with the baffle 158, by a pair of conventional screws 260, which pass respectively through conventional washers 262, suitable apertures (not shown) in integral ears 264 formed on the cylindrical portion 122, and suitable apertures (not shown) in the baffle 158, into suitable sockets (not shown) in integral posts 266 formed in the upper shell 60. As shown in FIGS. 3 and 7, the transverse portion 124 of the frame 120 is mounted within the broadened portion 56 of the console 50 by a pair of conventional screws 268, which pass respectively through conventional washers 270 and suitable apertures (not shown) in the transverse portion 124, into suitable sockets (not shown) in integral posts 272 formed in the upper shell 60.

As shown in FIG. 3, the transverse portion 124 of the frame 120 has an integral hub 288, which holds a bearing sleeve 290. A shaft 292 is journalled within the bearing sleeve 290 for rotation about a vertical axis. A conventional fastener 294 is snapped into a groove (not shown) in the shaft 292, where a lower end of the shaft 292 extends through the bearing sleeve 290, so as to secure the shaft 292 against movement upwardly through the bearing sleeve 290.

At its upper end, the shaft 292 is connected to a coupler 300 for rotation of the coupler 300 conjointly with the shaft 292. The coupler 300 is integral with a timing gear 302 beneath the coupler 300. The coupler 300 and the timing gear 302 may be fabricated, as a single part, from suitable molded plastic. A spring washer 304 is disposed around the shaft 292, between the timing gear 302 and an annular boss 306 on the bearing sleeve 290.

A timing gear 308, which is smaller than the timing gear 302 in relative diameter, is carried by the lower portion 134 of the shaft 112 of the armature 108 of the electric motor 100, above the impeller 140, for rotation of the timing gear conjointly with the shaft 112. The timing gear 308 and the timing gear 302 are coupled, by a flexible timing belt 310, so as to enable the coupler 300 to be driven by the electric motor 100 at reduced rotational speeds.

The coupler 300 is used when the driving unit 10 is combined with the food processor 30, as shown in FIGS. 14 through 18, but not when the driving unit 10 is combined either with the food mixer 20, as shown in FIGS. 1 through 13, or with the food blender 40, as shown in FIGS. 19 through 21. When combined either with the food mixer 20 or with the food blender 40, the coupler 300 must be covered by a cover 320, as described hereinafter.

The lower platform 58 of the console 50 includes a cavity 330, wich has an upper cylindrical wall 332, an upper annular ledge 334 extending inwardly from the cylindrical wall 332, a lower annular ledge 336 extending similarly beneath the upper annular ledge 334, a lower cylindrical wall 338, and an annular floor 340. The annular floor 340 has a central aperture 342 through which the coupler 300 extends upwardly, and an annular rib 344 which cooperates with the cover 320 in a manner described hereinafter.

Figure 8:
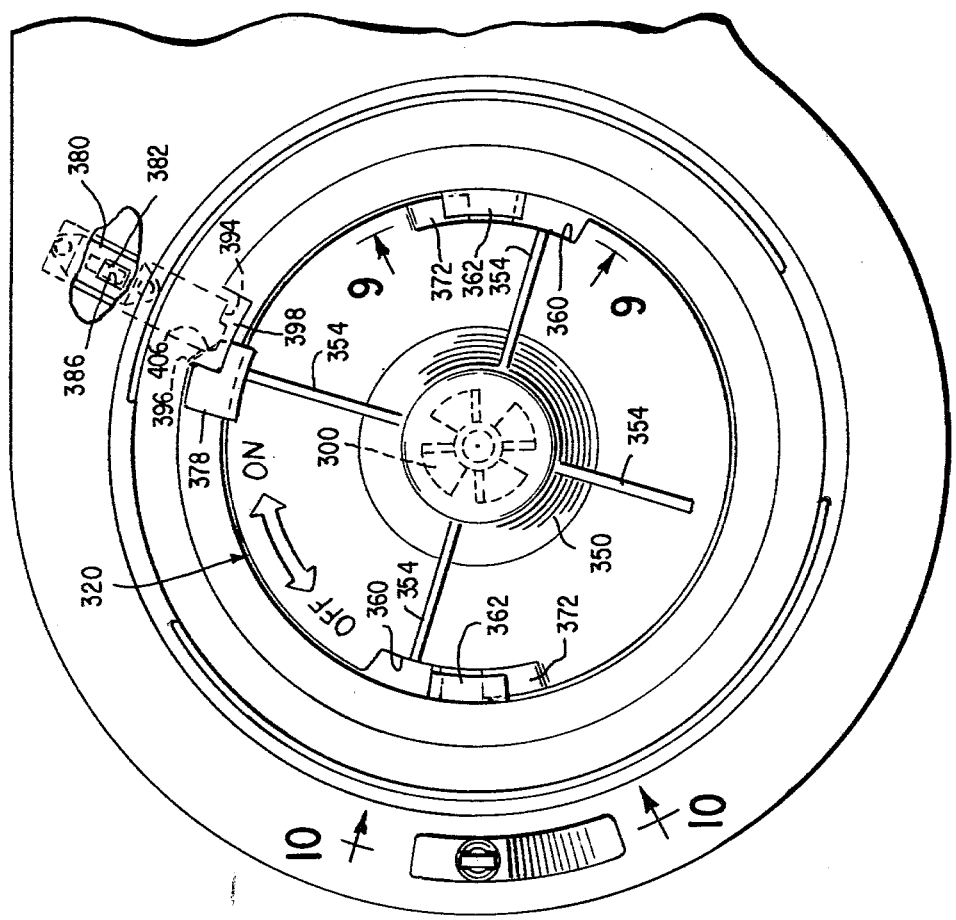
FIG. 8 is a horizontal view, which is taken approximately along line 8—8 of FIG. 3 in a direction indicated by arrows, on a further enlarged scale compared to FIG. 3.

As shown in FIGS. 3 and 8, the cover 320 includes a domed portion 350, which accommodates the coupler 300 for rotation of the coupler 300 beneath the cover 320, an annular rib 352, which fits within the annular rib 344 so as to center the cover 320 within the cavity 330. The annular rib 344 and the annular rib 352 allow the cover 320 to be rotated within the cavity 330 by a user. The cover 320 is formed with integral webs 354, which extend radially from the domed portion 350, so as to facilitate manipulation of the cover 320 by a user.

Figure 9:
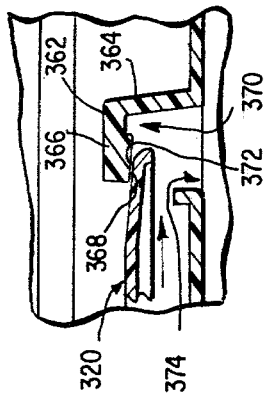
FIG. 9 is a fragmentary section, which is taken approximately along line 9—9 of FIG. 8 in a direction indicated by arrows.
Figure 10:
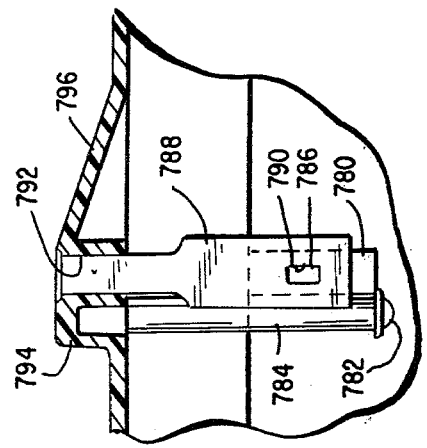
FIG. 10 is a framgentary section, which is taken approximately along line 10—10 of FIG. 8 in a direction indicated by arrows.

As shown in FIG. 8, the cover 320 has a pair of peripheral notches 360 fitting over respective locking flanges 362, which are located in diametric opposition to each other, and which are formed integrally on the lower cylindrical wall 338. As shown in FIG. 9, each locking flange 362 comprises an upright portion 364, which fits into one of the notches 360 so as to limit rotation of the cover 320 to that permitted by the notches 360, and a transverse portion 366, over which one of the notches 360 fits, which includes a camming surface 368 facing downwardly, and which has a pocket 370 formed between the camming surface 368 and the upright portion 364. The cover 320 has respective camming surfaces 372, which are adjacent to the notches 360, and which cooperate with the camming surfaces 368 so as to drive the cover 320 downwardly (for a tight fit with the locking flanges 362) as the cover 320 is rotated in a clockwise sense as viewed from above, and so as to release the cover 320 as the cover 320 is rotated oppositely. The pockets 370 have a function described hereinafter in specific regard to FIGS. 14 through 17. Respective openings 374 are provided in the annular floor 340, beneath the transverse portions 366, so as to allow spillage to drain from the cavity 330.

The cover 320 has an integral flange 378, which extends over the lower annular ledge 336, and which serves to close a single-pole, single-throw switch 380 when the cover 320 is lowered past the locking flanges 362 and rotated in a clockwise direction as viewed from above. The switch 380, which is mounted within the upper shell 60, has an actuator 382, which is biased inwardly (in a radial sense referring to FIG. 8) so as to cause the switch 380 to be switched to an opened mode, and which may be moved outwardly (in a radial sense referring to FIG. 8) so as to switch the switch 380 to a closed mode. An actuating link 384, which has an aperture 386 receiving the actuator 382, extends radially into the cavity 330 through an aperture 388 beneath the upper annular ledge 334. As shown in FIG. 7, the actuating link 384 has a camming surface 392 and a notch 394, which is located beyond the camming surface 392. As shown in FIG. 8, the integral flange 378 has a camming surface 406, which cooperates with the camming surface 392 so as to facilitate movement of the actuator 382 inwardly, and a nub 396, which cooperates with the notch 394 so as to lock the cover 320 in its lowered and rotated position wherein the switch 380 is closed. The cover 320 may be rotated from such position in counterclockwise sense as viewed from above, so as to open the switch 380 and so as to enable the cover 320 to be removed. An integral flange 398 extending inwardly from the upper annular ledge 334 protects the actuating link 384 against spillage from the mixing bowl 22. In FIG. 21, the switch 380 is indicated in its opened mode by a broken-lined arrow, and in its closed mode by a full-lined arrow.

A bearing ring 400, which comprises twelve ball bearings 402 retained bn an annular retainer 404, is placed upon the upper annular ledge 334. A turntable 410, which is shaped so as to accommodate the mixing bowl 22 snugly, is placed upon the bearing ring 400. The turntable 410 has an overturned lip 412, which fits over an integral rib 414 on the lower platform 58. The bearing ring 400 and the turntable 410 must be so placed when the driving unit 10 is used with the food mixer 20 and the mixing bowl 22. The bearing ring 400 and the turntable 410 are unnecessary but may be so placed when the driving unit 10 is combined with the food blender 40. The bearing ring 400 and the turntable 410 must be removed, along with the cover 320, when the driving unit 10 is combined with the food processor 30.

As shown in FIGS. 2, 3, and 11, the upper platform 54 of the console 50 includes a cavity 450, which has a frustoconical wall 452, an annular ledge 454 beneath the frustoconical wall 452, and an annular floor 456 having an annular rib 458 defining an aperture 460. A sleeve 462, which is formed integrally on the separate cover 126, is disposed within the aperture 460, which is sealed by an elastomeric sleeve 464 around the sleeve 462. The shaft 112 of the armature 108 of the electric motor 100 extends upwardly through the sleeve 462. The elastomeric sleeve 464 and the sleeve 462, which is oversize, accommodate minor misalignments in assembly. A coupler 470 is mounted on the upper end of the shaft 112 for rotation of the coupler 470 conjointly with the shaft 112. As described hereinafter, the coupler 470 is used not only when the driving unit 10 is combined with the food mixer 20 but also when the driving unit 10 is combined with the food blender 40. A sloped floor 472, which slopes downwardly, meres with the annular floor 456 and passes through a wide slot 474 in the frustoconical wall 452 so as to allow spillage to drain from the cavity 450, particularly when the driving unit 10 is combined with the food blender 40. Three upstanding segments 476 in an annular array are formed integrally on the annular floor 456 for a purpose described hereinafter.

As shown in FIGS. 2 and 5, a recess 480, which is formed in the console 50, is defined by cylindrical walls 482, which separate the recess 480 from the cavity 450, lateral walls 484, which are parallel, and lower shoulders 486. A bracket 490, which is described hereinafter, is mounted on the shoulders 486 by conventional screws 488. As shown in FIG. 5, the walls 482 are shorter than the bracket 490, in a vertical sense. A pair of vertical posts 492, which have threaded shanks 494 receiving respective nuts 496, are mounted to the console 50 so as to extend upwardly from the upper platform 54. The posts 492, which have respective circumferential notches 498, have a function described hereinafter.

As shown in FIGS. 3 through 6, the food mixer 20 comprises a mixing arm 500, which has a lower shell 502, which may be made of die-cast aluminum, and an upper shell 504, which may be made of suitable molded plastic. The lower shell 502 and the upper shell 504 are fastened together by four screws 506, which pass upwardly through respective apertures in the lower shell 502, through respective apertures in integral posts 510 in the lower shell 502, and into respective sockets in integral posts 512 (one shown in FIG. 5) in the upper shell 504.

The lower shell 502 is formed with an integral hub 520, which holds an upper bearing sleeve 522 and a lower bearing sleeve 524. A shaft 530 is journalled in the upper bearing sleeve 522 and the lower bearing sleeve 524. Below the integral hub 520, the shaft 530 carries an inverted cup 532 for rotation of the inverted cup 532 with the shaft 530. The inverted cup 532, which is covered with suitable elastomeric material 534, is shaped so as to cooperate with the coupler 470, which fits into the inverted cup 532 when the food mixer 20 is mounted pivotally to the console 50, so as to enable the shaft 530 to be driven from the electric motor 100. The elastomeric material 534 provides for quiet operation and accommodates minor misalignments.

Above the integral hub 520, the shaft 530 carries a timing gear 538 of a power train 540, by which the mixing beaters 24 are driven from the electric motor 100. The power train 540, which is carried by the mixing arm 500, comprises the inverted cup 532, the shaft 530, and the timing gear 538, as described hereinbefore. The power train 540 also comprises a timing gear 542, which is larger than the timing gear 538 in relative diameter, and which is coupled to the timing gear 538 by a flexible timing belt 544 of the power train 540. The timing gear 542 is carried by a shaft 546 for rotation of the timing gear 542 conjointly with the shaft 546. The shaft 546 is journalled in a lower bearing sleeve 548, which is held by an integral hub 550 formed in the lower shell 502, and in an upper bearing sleeve 552, which is held by an integral hub 554 formed in a separate cover 556. The separate cover 556, which may be made of die-cast aluminum, is fastened to the lower shell 502 within the mixing arm 500 by conventional screws 558.

Between the upper bearing sleeve 552 and the lower bearing sleeve 548, the shaft 546 carries a pinion 560, which rotates conjointly with the shaft 546. The pinion 560 intermeshes with a larger gear 562. The larger gear 562 and a smaller gear 564, which is located beneath the larger gear 562, are carried by a tubular spindle 570, which is journalled in a bearing sleeve 572. The bearing sleeve 572 is held in an integral hub 574 formed in the separate cover 556. The tubular spindle 570, which is adapted to receive a shank 576 of one mixing beater 24, has an internal key 578, which cooperates with a slot 580 in the upper end of the shank 576 so as to assure proper rotational alignment of the mixing beater 24 having the shank 576. Another smaller gear 582, which is similar to the smaller gear 564, and which intermeshes with the smaller gear 564, is carried by a tubular spindle 584, which is journalled in a bearing sleeve 586. The bearing sleeve 586 is held in an integral hub 588 formed in the separate cover 556. The tubular spindle 584, which is adapted to receive a shank 590 of another mixing beater 24, has an internal key 592, which cooperates with a slot 594 in the upper end of the shank 590 so as to assure proper rotational alignment of the mixing beater 24 having the shank 590. The mixing beaters 24 thus are drivable in opposite rotational senses.

As mentioned hereinbefore, the broadened portion 56 of the console 50 is offset forwardly. Thus, the mixing bowl 22 is offset forwardly, whereby one mixing beater 24 is nearer to the flared wall 26 of the mixing bowl 22. In well known manner, the mixing beater 24 near the flared wall 26 of the mixing bowl 22 may be provided with a lower button 596, which is adapted to be disposed in frictional engagement with the mixing bowl 22 so as to cause the mixing bowl 22 and the turntable 410 to rotate conjointly with the mixing beater 24 provided with the lower button 596. Such a button for a similar purpose is described in U.S. Pat. No. 2,552,972.

Alternatively, the mixing beaters 24 may be replaced by interoperative dough hooks (not shown) to be received by the tubular spindle 570 and the tubular spindle 584 respectively. Suitable dough hooks are disclosed in a co-pending patent application which was filed April 26, 1979, under U.S. Ser. No. 33,584, by Daniel C. Stahley, William H. Scott, and Mohamed K. Wagdy for Food Mixer, which is assigned commonly herewith, and which is incorporated herein by reference. Additional keying means (not shown) may be provided so as to prevent rotational misalignment of either dough hook by 180°. Such keying means may include an integral key formed on the shank of the dough hook and an axial keyway formed in the lower end of the associated spindle.

Shank-retaining means (not shown) of a conventional type, which may include suitable springs carried by the respective shanks and adapted to be received in suitable grooves in the respective spindles, may be provided so as to retain the respective shanks of the mixing beaters 24 releasably in the respective spindles. The respective shanks of the dough hooks may be retained in the respective spindles by improved retaining means disclosed in said copending patent application for Food Mixer.

An ejecting lever 600 is provided. The shank 576 of the one beater 24 carries an integral boss 602. The shank 590 of the other beater 24 carries an integral boss (not shown) similar to the integral boss 602. Similar integral bosses may be provided on the shanks of the dough hooks. The ejecting lever 600, which has flanged portions 604 mounted pivotally to an integral post 606 mounted between flanges (not shown) on the lower shell 502, and which pivots in an aperture 610 provided in the lower shell 502, engages the boss 602, on the shank 576 and the similar boss on the shank 590. The ejecting lever 600 is biased to an inoperative position by a spring coil 620, which is piloted over a nub 622 on the separate cover 556 and over a nub 624 on the ejecting lever 600. An external button 626, which is carried by the ejecting lever 600, has a lip 628, which engages a raised margin of the aperture 610 so as to limit pivotal movement of the ejecting lever 600 as biased by the spring coil 620, in a counterclockwise sense referring to FIG. 3. The external button 626 may be pressed upwardly by a user so as to cause the mixing beaters 24 (or the dough hooks) to be ejected from the respective spindles by the ejecting lever 600 upon pivotal movement of the ejecting lever 600 in an opposite sense, in a clockwise sense referring to FIG. 3.

The flexible timing belt 544 tends to absorb physical shocks transmitted via the mixing beaters 24 (or the dough hooks) and the timing gear 542. Thus, quiet operation is achieved, and such shocks tend not to be transmitted to the electric motor 100.

As in prior food mixers, the mixing arm 500 is adapted to be mounted pivotally to the pyramidal portion 52 of the console 50, near the right end of the mixing arm 500 referring to FIG. 3, for pivotal movement through plural pivotal positions including a lowered position, in which the mixing arm 500 is shown in full lines in FIGS. 1, 3, and 5, and a raised position, in which the mixing arm 500 is shown in phantom lines in FIG. 5.

In the lowered position of the mixing arm 500, the mixing arm 500 extends transversely over the mixing bowl 22, and the mixing beaters 24 extend operatively into the mixing bowl 22. In the raised position of the mixing arm 500, the mixing beaters 24 are removed from the mixing bowl 22, whereupon the mixing bowl 22 and its contents safely may be removed from the turntable 410.

Near the right end of the mixing arm 500 referring to FIG. 3, the lower shell 502 of the mixing arm 500 has a flanged portion 630, which extends into the recess 480, between the walls 484, when the mixing arm 500 is mounted pivotally to the pyramidal portion 52 of the console 50. The flanged portion 630 has parallel lateral walls 632 and a bracing wall 634. The lower shell 502 also has a tubular portion 640, which encloses the inverted cup 532 radially, and which fits around the segments 476 so as to center the inverted cup 532 coaxially with the coupler 470 upon pivotal movement of the mixing arm 500 to its lowered position. The upper shell 504 of the mixing arm 500 has an integral skirt 646, which is disposed against the bracing wall 634 of the flanged portion 630, as shown in FIG. 5.

Thus, the coupler 470 is adapted to couple the electric motor 100 to the power train 540 so as to enable the mixing beaters 24 to be driven by the electric motor 100 upon pivotal movement of the mixing arm 500 to its lowered position. Also, the coupler 470 is adapted to uncouple the electric motor 100 from the power train 540 so as to disable the mixing beaters 24 upon pivotal movement of the mixing arm 500 from its lowered position.

As described hereinafter, a latching and pivoting mechanism 650 is adapted to be latched automatically so as to prevent relative movement of the mixing arm 500 and the console 50 upon pivotal movement of the mixing arm 500 either to its lowered position or to its raised position, and so as to prevent relative movement of the mixing arm 500 and the console 50, except for pivotal movement of the mixing arm 500, upon pivotal movement of the mixing arm 500 to a pivotal position between the lowered position and the raised position. Also, the latching and pivoting mechanism 650 is adapted to be unlatched manually so as to permit pivotal movement of the mixing arm 500 from any pivotal position, and so as to permit the mixing arm 500 to be removed from the console 50 upon further movement of the mixing arm 500, in a sense opposite to pivotal movement of the mixing arm 500 from its raised position toward its lowered position, to a further position beyond the raised position. Thus, the mixing arm 500 may be removed from the console 50, upon further movement of the mixing arm 500 from its raised position, in a clockwise sense referring to FIG. 3, to an upright position.

The latching and pivoting mechanism 650 comprises the bracket 490, which has parallel plates 652 and a base 654. The plates 652 and the base 654 are integral parts of the bracket 490. The plates 652 are disposed against the respective walls 484 of the recess 480. The screws 488 pass through respective apertures in the base 654. The plates which are mirror images of each other, have slotted portions defining parallel ways 656, lower notches 658, and upper notches 660. Each way 656 has a mouth 662, an upper, horizontal edge 664, an inner, vertical edge 666, and a lower, cupped edge 668, which defines a cup 670.

The latching and pivoting mechanism 650 comprises parallel pivots 680, which extend laterally from the lateral walls 632 of the flanged portion 630 of the lower shell 502 of the mixing arm 500 when the mixing arm 500 is mounted pivotally to the pyramidal portion 52 of the console 50. Each pivot 680 comprises a first pin 682 which passes through an aperture in one lateral wall 632, and a second pin 684, which passes through another aperture in the same wall 632. The first pins 682 and the second pins 684 are disposed in parallel relation to each other.

Upon pivotal movement of the mixing arm 500 to its lowered position, the first pins 682 are disposed over the second pins 684, as shown in full lines in FIG. 5. Also, the first pins 682 are disposed against the upper, horizontal edges 664 of the respective ways 656, the second pins 684 are disposed against the inner, vertical edges 666 of the respective ways 656, and the first pins 682 are disposed in the cups 670 of the respective ways 656. Thus, the mixing arm 500 can be pivoted freely on the first pins 682, which are adapted to turn within the cups 670, but the mixing arm 500 cannot be lifted from the console 50 because of the second pins 684 engaging the upper, horizontal edges 664.

Upon pivotal movement of the mixing arm 500 to its raised position, the first pins 682 and the second pins 684 assume oblique relative positions, as shown in phantom lines in FIG. 5. Upon further movement of the mixing arm 500, in a clockwise sense referring to FIG. 5, to an upright position, the first pins 682 and the second pins 684 may be withdrawn through the mouths 662 of the respective ways 656, for detachment of the mixing arm 500 from the pyramidal portion 52 of the console 50. Likewise, the mixing arm 500 must be disposed in an upright position so as to enable the first pins 682 and the second pins 684 to be inserted through the mouths 662 of the respective ways 656, for attachment of the mixing arm 500 to the pyramidal portion 52 of the console 50.

The latching and pivoting mechanism 650 comprises a pair of similar links 690, which are formed integrally on a bracket 692, and which extend through respective slots 694 formed in the lower shell 502 of the mixing arm 500. The bracket 692 has an integral base 696 and integral upturned sides 698. The integral base 696 has a pair of elongated slots 702, which admit respective screws 704 fastened in respective threaded sockets 706 formed integrally in the lower shell 502, so as to permit limited movement of the bracket 692 including the links 690 along the mixing arm 500 in a locking direction, which is to the right referring to FIGS. 4 and 5, and in an unlocking direction, which is to the left referring to FIGS. 4 and 5.

The upturned sides 698 have respective flanged portions 708, to which a button 710 is attached at slotted lateral portions 712 of the button 710, for movement of the button 710 conjointly with the bracket 692 including the links 690. The button 710 extends outwardly through an aperture 714, which is formed in the upper shell 504 above its integral skirt 646. A coiled spring 716, which is piloted over an integral nub 718 within the button 710, bears against an integral post 720, which is formed on the lower shell 502, so as to bias the button 710 and the bracket 692 including the links 690 outwardly in the locking direction of the bracket 692 including the links 690.

The latching and pivoting mechanism comprises a pair of similar pins 730, which extend laterally from the respective links 690. The lower notches 658 of the bracket 490 are disposed to receive the pins 730, upon pivotal movement of the mixing arm 500 to its lowered position, so as to prevent pivotal movement of the mixing arm 500 from its lowered position while the pins 730 remain in the lower notches 658. The upper notches 660 of the bracket 490 are disposed to receive the pins 730, upon pivotal movement of the mixing arm 500 to its raised position, so as to prevent pivotal movement of the mixing arm 500 from its raised position while the pins 730 remain in the upper notches 660.

The plates 652 of the bracket 490 have curved edges 736, between the lower notches 658 and the upper notches 660, so as to provide adquate clearance for the pins 730 during pivotal movement of the mixing arm 500 between its lowered and raised positions. The plates 652 also have curved edges 738, beyond the upper notches 660, so as to provide adequate clearance for the pins 730 during further movement of the mixing arm 500 from its raised position, in a clockwise sense referring to FIG. 5.

After the first pins 682 and the second pins 684 of the respective pivots 680 have been inserted into the respective ways 656 for attachment of the mixing arm 500 to the pyramidal portion 52 of the console 50, the button 710 is pressed manually so as to move the bracket 692 including the links 690 in the unlocking direction, and so as to move the pins 730 accordingly, whereupon the pins 730 clear the bracket 490 so as to allow the mixing arm 500 to be moved in a counterclockwise sense referring to FIG. 5. If the button 710 is released so as to cause the pins 730 to ride along the edges 738, the pins 730 are pulled automatically into the upper notches 660, once the mixing arm 500 reaches its raised position, by the coiled spring 716, so as to latch the mixing arm 500 automatically in its raised position. For detachment of the mixing arm 500 from the pyramidal portion 52 of the console 50, the button 710 is pressed similarly, whereupon the pins 730 are removed from the upper notches 660 so as to allow the mixing arm 500 to be moved in a clockwise sense referring to FIG. 5.

For movement of the mixing arm 500 from its raised position to its lowered position, the button 710 is pressed similarly, whereupon the pins 730 are removed from the upper notches 660 so as to allow the mixing arm 500 to be pivoted in a counterclockwise sense referring to FIG. 5. Between the raised and lowered positions of the mixing arm 500, the button 710 may be released so as to cause the pins 730 to ride along the edges 736, whereupon the pins 730 are pulled automatically into the lower notches 658, by the coiled spring 716, so as to latch the mixing arm 500 automatically in its lowered position.

For movement of the mixing arm 500 from its lowered position to its raised position, the button 710 is pressed similarly, whereupon the pins 730 are removed from the lower notches 658 so as to allow the mixing arm 500 to be pivoted in a clockwise sense referring to FIG. 5. Between the lowered and raised positions of the mixing arm 500, the button 710 may be released so as to cause the pins 730 to ride along the edges 736, whereupon the pins 730 are pulled automatically into the upper notches 660 by the coiled spring 716, so as to latch the mixing arm 500 automatically in its raised position.

The latching and pivoting mechanism 650 comprises the posts 492, which have the circumferential notches 498, which have respective rounded heads 748, and which extend into the mixing arm 500 through respective apertures 752 in the lower shell 502 of the mixing arm 500 when the mixing arm 500 is disposed in its lowered postion. The latching and pivoting mechanism 650 also comprises a latching plate 760, which has integral vertical flanges 762 connected pivotally to the respective sides 698 of the bracket 692 by respective pins 764, so as to be movable conjointly with the bracket 692.

The latching plate 760 is formed with a slot 766, through which a stud 770 extends, and which allows the latching plate 760 to move conjointly with the bracket 692. The stud 770 is capped by a washer 772, which overlies the latching plate 760, and which is secured by a spring fastener 774 snapped into a circumferential groove on the stud 770. The stud 770 has an integral, annular boss 776, which supports the latching plate 760. The stud 770 is threaded into an integral socket 778, which is formed on the lower shell 502 of the mixing arm 500, and which is open at its lower end so as to allow the stud 770 to be adjusted threadably for pivotal alignment of the latching plate 760.

The latching plate 760 has respective hooked portions 790, which are adapted to be engaged in the circumferential notches 498 of the respective posts 492, upon pivotal movement of the mixing arm 500 to its lowered position, so as to prevent pivotal movement of the mixing arm 500 from its lowered position. Between the lowered and raised positions of the mixing arm 500, if the button 710 is released, the hooked portions 790 ride along the rounded heads 748 of the respective posts 492 with a camming action.

Thus, pivotal movement of the mixing arm 500 from its lowered position is prevented (unless and until the button 710 is pressed inwardly) not only because of the respective pins 730, which are disposed in the lower notches 658 of the bracket 490, but also because of the hooked portions 790, which are engaged in the circumferential notches 498 of the respective posts 492. Advantageously, the mixing arm 500 cannot pivot upwardly from its lowered position under heavy loads, as may be imparted upwardly on the mixing arm 500, particularly but not exclusively if the dough hooks are used. Such loads are not imparted when the mixing arm 500 is disposed in its raised position.

As shown in FIGS. 3, 7, 8, and 10, and as indicated in FIG. 24, a single-pole, single-throw switch 780 is mounted by a screw 782 to an integral post 784 formed in the upper shell 60 of the console 50, the broadened portion 56 of the console 50. The switch 780 has an actuator 786, which is biased in an upward direction so as to switch the switch 780 to an opened mode, and which may be moved in a downward direction referring to FIG. 3 so as to switch the switch 780 to a closed mode. An actuating link 788 has an aperture 790, through which the actuator 786 is fitted, and extends upwardly through (but not beyond) an aperture 792, in an integral pedestal 794, which is formed on the upper shell 60, and which has a sloped surface 796. In FIG. 24, the switch 780 is indicated in its opened mode by a broken-lined arrow, and in its closed mode by a full-lined arrow.

As shown in FIGS. 3, 13, and 16, and as indicated in FIG. 24, a double-pole, double-throw switch 810 is mounted by a flanged strip 812, which is fastened to the switch by two rivets 814 and to the separate cover 126 by screws 816, in the pyramidal portion 52 of the console 50. The switch 810 has an actuator 820, which is biased in an upward direction referring to FIG. 3 so as to switch the switch 810 to a first mode, and which may be moved in a downward direction referring to FIG. 3 so as to switch the switch 810 to a second mode. An actuating link 822 has an aperture 824, through which the actuator 820 is fitted, and extends upwardly through (but not beyond) an aperture 826 in a recess 828 formed in the pyramidal portion 52, across the cavity 450 from the recess 480. In FIG. 24, the switch 810 is indicated in its first mode by two broken-lined arrows, and in its second mode by two full-lined arrows.

As shown in FIGS. 14 through 20, the driving unit 10 is combined with the food processor 30, which requires the special adapter 32. The special adapter 32 comprises a cylindrical skirt 840, which fits into the cavity 330, and which has opposite peripheral notches 842 fitting over the locking flanges 362, described hereinbefore. The cylindricla skirt 840 has opposite hooked portions 844, which extend peripherally into the peripheral notches 842, and which are adapted to be engaged in the respective pockets 370 of the locking flanges 362.

The special adapter 32 also comprises an integral hub 850, which is reinforced by integral radial webs 850, and which supports a bearing sleeve 852. A shaft 854 is journalled in the bearing sleeve 852. At its lower end, the shaft 854 carries an inverted cup 860, which is covered by an elastomeric material. The spring washer 304 allows the coupler 300 to be pressed downwardly, as the hooked portions 844 of the cylindrical skirt 840 pass along the camming surfaces 368 of the locking flanges 362, and biases the hooked portions 844 into the respective pockets 370 of the locking flanges 362 so as to lock the special adapter 32 releasably in the cavity 330. The inverted cup 860 is shaped so as to fit over the coupler 300, and so as to enable the shaft 854 to be driven from the electric motor 100 through the coupler 300, when the special adapter 32 is locked releasably in the cavity 330.

The special adapter 32 comprises a circular platform 870, which is formed integrally with the cylindrical skirt 840, and which has a rim 872 having a pair of radial nubs 874 and a plurality of elevated spacers 876, and which has a pair of additional spacers 878 of equal elevation. At its upper end, the shaft 854 extends above the circular platform 870 and carries a driving spindle 880, which is non-circular in cross-section at its upper end.

The food processor 30 is assembled from a container 900 and a cover 910 for the container 900. The container 900 and the cover 910 are common components of prior food processors, which are driven from separable driving units, and which are sold (inclusive of such driving units) by Sunbeam Corporation through its division, Sunbeam Appliance Company, 5400 West Roosevelt Road, Chicago, Ill. 60650, under Catalog No. 14-11 of Sunbeam Appliance Company. The driving unit 10 differs markedly from prior driving units for such food processors. The special adapter 32 is not used in such food processors.

The container 900, which is made of suitable transparent plastic, has a cylindrical wall 912, an annular base 914 extending transversely within the cylindrical wall 912, a central sleeve 916 extending upwardly from the annular base 914, and a cylindrical skirt 918 continuing downwardly from the cylindrical wall 912. The cover 910, which is made of suitable transparent plastic is adapted to be secured removably on the container 900. Proper rotational alignment of the cover 910 and the container 900 requires the cover 910 to be rotated in a clockwise sense referring to FIG. 15, until an integral nub 920 on one cylindrical wall 912 enters a suitable pocket 922 in a flanged portion 924 of the cover 910, so as to dispose a flanged portion 930 of the cover 910 over the pedestal 794 on the upper shell 60 of the console 50.

The cover 910 includes a chute 934, which extends upwardly from the cover 910, which provides restricted access for food to be pushed into the container 900, but which does not allow a user to put his fingers into the container 900. A pusher 938, which is another component common to such food processors, fits slidably into the chute 934 as far as permitted by a rim 936 of the pusher 938. The pusher 938 is shaped so as to be useful as a measuring cup.

A handle 950, which is another component common to prior food processors mentioned hereinbefore as sold by Sunbeam Corporation, is made of suitable molded plastic and is attached by a screw 952 to a flanged framework 954, which includes an upper flange 956 having an aperture accommodating the screw 952, which includes spaced vertical flanges 958, and which is formed integrally on the cylindrical wall 912. A rod 960, which is another component common to such food processors sold by Sunbeam Corporation, is disposed vertically within the flanged framework 954, between the handle 950 and the cylindrical wall 912. The rod 960 is movable upwardly so as to extend through an aperture in the upper flange 956, as far as permitted by an upper boss 962 on the rod 960, and downwardly so as to extend through a slot 964 in a lower flange 966 formed integrally on the handle 950 and disposed between the vertical flanges 958, as far as permitted by a lower boss 968 on the rod 960. The flanged portion 930 of the cover 910 has a depending flange 970 having a camming surface 972, which cams the rod 960 downwardly as the cover 910 is rotated in a clockwise sense referring to FIG. 15 for proper rotational alignment of the cover 910. The flanged framework 954 includes a vertical rib 974, which is formed along one of the vertical flanges 958, and which confines the lower boss 968 so as to center the rod 960 in the slot 964.

the cylindrical skirt 918 fits around the nubs 874 on the rim 872 of the special adapter 32 when the container 900 is placed on the spacers 876 and the spacers 878. The cylindrical skirt 918 is formed with vertical ribs 982, which center the cylindrical skirt 918 around the rim 872, and with internal formations 984 defining respective pockets 986, which receive the nubs 874 so as to prevent upward removal of the container 900 from the special adapter 32, and so as to provide proper rotational alignment of the container 900 and the special adapter 32.

Accordingly, if the special adapter 32 is secured properly in the cavity 330, if the container 900 is secured properly on the special adapter 32, and if the cover 910 is secured properly on the container 900 in that sequence, the rod 960 is cammed downwardly through the aperture 792 in the pedestal 794 on the upper shell 60 of the console 50 so as to drive the actuating link 788 downwardly, whereupon the switch 780 is switched to its closed mode. In prior food processors mentioned hereinbefore as sold by Sunbeam Corporation, equivalent rods actuate comparable switches, which must be actuated before the food processor can be operated.

When the rod 960 is cammed downwardly through the aperture 792 in the pedestal 794, relative rotation of the food processor 30 and the console 50 is prevented, in addition to relative rotation of the container 900 and the special adapter 32. Because of the rod 960, the cover 910 must be removed before the container 900 is attached, so as to allow the rod 960 to be cammed upwardly by the sloped surface 796 on the pedestal 794 as the container 900 is rotated on the special adapter 32.

Also, the cover 910 must be removed so as to enable a processing tool 990 to be coupled to the driving spindle 880, although the processing tool 990 cannot be driven until the cover 910 is mounted properly on the container 900. As shown in FIG. 16, the processing tool 990 is another component common to prior food processors, which employ similar driving spindles. As discussed hereinabove, the driving spindle 880 is non-circular in cross-section. The processing tool 990 comprises a central hub 992, which has an integral handle 994, and respective blades 996, which are attached suitably to the central hub 992. The central hub 992, which is shaped so as to fit over the central sleeve 916 of the container 900, has a tubular portion 998, which fits into the central sleeve 916 and over the driving spindle 880, and which is non-circular in internal section so as to rotate conjointly with the driving spindle 880. The processing tool 990 may be replaced by other processing tools compatible with the driving spindle 880.

as shown in FIGS. 14 through 17 and 20, a cover 1000 is mounted removably to the console 50, on the pyramidal portion 52 of the console 50, so as to cover the coupler 470. The cover 1000 includes a skirt 1002, which fits across the recess 480 and a skirt 1004, which fits across the recess 828. The cover 1000 comprises a probe 1006, which is formed integrally along the skirt 1004, and which fits into the aperture 826 in the recess 828 so as to push the actuating link 822 downwardly. Thus, when the cover 1000 is mounted properly on the pyramidal portion 52 of the console 50, the switch 810 is switched to its second mode. The cover 1000 must be removed when the driving unit 10 is combined either with the food mixer 20 or with the food blender 40.

As shown in FIGS. 16 and 20, the cover 1000 is provided with a latching mechanism 1010, which cooperates with the posts 492 having the circumferential notches 498. the latching mechanism 1010 comprises a latching plate 1012, which has a flanged portion 1014, which has an integral button 1016, and which may be made of suitable molded plastic. The latching plate 1012 has a pair of elongated slots 1018, which admit respective screws 1020 having associated washers 1022 beneath the latching plate 1012, and which allow limited movement of the latching plate 1012 within the cover 1000. The screws 1020 are threaded into respective sockets 1024 formed integrally in the cover 1000. A rib 1026, which is formed integrally in the cover 1000, fits into a slot 1028 in the flanged portion 1014 so as to guide such movement. A leaf spring 1030, which is bowed over a post 1032 formed integrally in the cover 1000 (between the sockets 1024) and held at opposite ends in slotted flanges 1034 formed integrally on the latching plate 1012, biases the latching plate 1012 in a latching direction, to the left referring to FIG. 20. The integral button 1016, which extends through an aperture 1036 in the cover 1000, may be pressed manually so as to move the latching plate 1012 in an unlatching direction, to the right referring to FIG. 20. The latching plate 1012 has hooked portions 1038, which are adapted to be engaged in the circumferential notches 498 of the respective posts 492, so as to latch the cover 1000 releasably on the pyramidal portion 52 of the console 50.

The rounded heads 748 of the respective posts 492 cam the latching plate 1012 in the unlatching direction as the cover 1000 is placed on the pyramidal portion 52 of the console 50. When the integral button 1016 is pressed manually, the cover 1000 is released.

As shown in FIGS. 21 through 23, the driving unit 10 is combined with the food blender 40. As shown in FIG. 22, the food blender 40 is assembled from an upright jar 1040, which may be made of glass, an annular cover 1042, which fits onto the jar 1040, a separate plug 1044, which fits into the annular cover 1042, an annular gasket 1046, which is disposed beneath the jar 1040, and a lower subassembly 1050, which includes rotary blades 1052 constituting a processing tool, and which threads onto the jar 1040.

The jar 1040 has an integral handle 1060. The annular cover 1042, which is made of suitable elastomeric material, is adapted to be secured frictionally on the jar 1040 so as to reduce spillage from the jar 1040 in operation of the food blender 40. The annular cover 1042, which has a central aperture 1064, may be used to cover an upper mouth 1066 of the jar 1040 except for the central aperture 1064, through which materials to be processed may be added to the jar 1040, in operation of the food blender 40. The separate plug 1044, which is made of suitable molded plastic, is adapted to close the central aperture 1064 and is shaped so as to be useful as a measuring cup. The food blender 40 may be operated without the annular cover 1042.

The jar 1040 has a lower mouth 1070. The annular gasket 1046, which is made of suitable elastomeric material, fits around the lower mouth 1070 so as to seal the lower mouth 1070 when the lower subassembly 1050 is attached. The jar 1040 has a threaded neck 1072, which terminates in the lower mouth 1070, and which is adapted to receive the lower subassembly 1050. The lower subassembly 1050 comprises a threaded cup 1074, which threads into the threaded neck 1072. The threaded cup 1074 has tapered outer ribs 1076, which are shaped so as to fit snugly within the frustoconical wall 452 of the cavity 450 in the pyramidal portion 52 of the console 50, and a central aperture 1078. Because the integral handle 1060 can fit either into the recess 480 or into the recess 828, the food blender 40 may be supported in the cavity 450 either as shown (for convenience of a user who is right-handed) or as rotated 180° about a vertical axis.

As shown in FIG. 23, the lower subassembly 1050 comprises a bearing hub 1080, which is secured removably to the jar 1040 by the threaded cup 1074, and which includes an annular portion 1082 disposed beneath the annular gasket 1046, a bearing sleeve 1084, which is fitted into the bearing hub 1080, and a spindle 1086, which is journalled in the bearing sleeve 1084. At its upper end, the spindle 1086 carries the blades 1052, which are attached suitably for rotation conjointly with the spindle 1086. At its lower end, the spindle 1086 has a threaded stub 1088, which has right-hand threads so as to be self-tightening in operation of the food blender 40, and which extends downwardly through the central aperture 1078 of the threaded cup 1074, and which is threaded into a threaded socket in an inverted cup 1090. The inverted cup 1090, which is covered with suitable elastomeric material, is shaped so as to cooperate with the coupler 470, which fits into the inverted cup 1090 when the food blender 40 is mounted suitably on the pyramidal portion 52 of the console 50, so as to enable the spindle 1086 to be driven from the electric motor 100. The elastomeric material provides for quiet operation and accommodates minor misalignments.

Except for minor modifications reflected in the lower subassembly 1050 for compatibility with the driving unit 10, the jar 1040, the annular cover 1042, the separate plug 1044, the annular gasket 1046, and the blades 1052are common components of prior food processors, which are driven from separable driving units, and which are sold (inclusive of such driving units) by Sunbeam Corporation through its division, Oster, 5055 North Lydell Avenue, Milwaukee, Wis. 53217. The driving unit 10 differs markedly from prior driving units for such food blenders.

FIG. 24 is a diagram of electrical circuits of the driving unit 10, in which an interlocking means 1200 comprising the switch 380, the switch 780, and the switch 810 disables the electric motor 100 if the coupler 300 is neither coupled to the food processor 30 nor covered by the cover 320, and if the coupler 470 is not covered by the cover 1000 when the food processor 30 is coupled to the coupler 300. As discussed hereinbefore, the switch 380 is adapted to be opened normally and to be closed when the cover 320 covers the coupler 300, the switch 780 is adapted to be opened normally and to be closed when the food processor 30 is supported operatively on the transverse portion 56 of the console 50 so as to be coupled to the coupler 300, and the switch 810 is adapted to be switched to its first mode normally and to be switched to its second mode when the cover 1000 covers the coupler 470. In FIG. 24, the switch 810 is indicated in its first mode by two broken-lined arrows, and in its second mode by two full-lined arrows.

The interlocking means 1200 enables the electric motor 100 if the switch 380 is closed, while the switch 810 is switched to its first mode, whereupon either the food mixer 20 or the food blender 40 can be driven from the electric motor 100 if the cover 320 covers the coupler 300 so as to close the switch 380. It does not matter whether the switch 810 is switched to its first mode before or after the switch 380 is closed.

The interlocking means 1200 enables the electric motor 100 if the switch 780 is closed, while the switch 810 is switched to its second mode, whereupon the food processor 30 can be driven from the electric motor 100 if the food processor 30 is supported on the transverse portion 56 of the console 50 so as to close the switch 780, and if the cover 1000 covers the coupler 470 so as to switch the switch 810 to its second mode. It does not matter whether the switch 810 is switched to its second mode before or after the switch 780 is closed.

As indicated in FIG. 24, the electric motor 100 is connected to a power supply 1210 comprising, in series, a source 1220 of electric power, 120 VAC, 60 Hz, the switch 166 and the switch 168 in parallel, and the feedback motor control circuit 1230, which is the feedback motor control circuit discussed hereinbefore. The power supply 1210 delivers electrical power to the electric motor 100, which operates at rotational speeds determined by selected settings of the potentiometer 164 included in the feedback motor control circuit 1230, when either the switch 166 or the switch 168 is closed.

The field coil 104 of the electric motor 100 is connected between a given side of the power supply 1210 and an arm 810a of the switch 810. The field coil 106 of the electric motor 100 is connected between the other side of the power supply 1210 and an arm 810b of the switch 810. When the switch 810 is switched to its first mode, the arm 810a connects with field coil 104 to a contact 810w of the switch 810. When the switch 810 is switched to its second mode, the arm 810a connects the field coil 104 to a contact 810x of the switch 810. When the switch 810 is switched to its second mode, the arm 810b is switched to a contact 810y of the switch 810. When the switch 810 is switched to its second mode, the arm 810b is switched to a contact 810z of the switch 810.

The contact 810w and the contact 810z are shunted. The contact 810x is connected to an arm 780a of the switch 780. When the switch 780 is closed, the arm 780a is switched to a contact 780c of the switch 780. The armature coil 110 of the electric motor 100 is connected between the contact 780c and the contact 810z. The contact 780c is connected to an arm 380a of the switch 380. When the switch 380 is closed, the arm 380a is switched to a contact 380c of the switch 380. The contact 380c and the contact 810y are shunted.

If the switch 380 is closed, if the switch 810 is switched to its first mode, and if the switch 166 (or the switch 168) is closed, current from the power supply 1210 flows through the field coil 104, the arm 810a, the contact 810w, the contact 810z, the armature coil 110, the contact 780c, the arm 380a, the contact 380c, the contact 810y, the arm 810b, and the field coil 106, to the power supply 1210. Thus, either the food mixer 20 or the food blender 40 can be driven from the electric motor 100, which drives the coupler 470 in a counterclockwise sense when viewed from above because of relative polarities of the field coil 104, the field coil 106, and the armature coil 110.

If the switch 780 is closed, if the switch 810 is switched to its second mode, and if the switch 166 (or the switch 168) is closed, current flows through the field coil 104, the arm 810a, the contact 810x, the armature coil 110, the contact 810z, the arm 810b, and the field coil 106, to the power supply 1210. Thus, the food processor 30 can be driven from the electric motor 100, which drives the coupler 300 in a clockwise sense when viewed from above because of relative polarities of the field coil 104, the field coil 106, and the armature coil 110.

Thus, when the switch 810 is switched between its first mode and its second mode, series connections of the armature coil 110 between the field coil 104 and the field coil 106 are reversed. Hence, the processing tools common to prior food mixers and designed to be driven in a counterclockwise sense when viewed from above, the processing tools common to prior food processors and designed to be driven in a clockwise sense when viewed from above, and the processing tools common to prior food blenders and designed to be driven in a counterclockwise sense when viewed from above can be used.

We claim:
1. In a food-mixing apparatus comprising
(a) a console, which has a transverse portion and an upright portion,
(b) a mixing bowl, which is supported on the transverse portion,
(c) a motor, which is mounted in the console,
(d) an arm, which is mounted pivotally to the upright portion, for pivotal movement through positions including a lowered position, wherein the arm extends transversely over the mixing bowl supported on the transverse portion, and a raised position,
(e) a mixing tool, which is mounted operatively to the arm,

(f) a power train, which is carried by the arm so as to be coupled to the mixing tool mounted operatively to the arm, and (g) a coupler, which is driven by the motor, and which cooperates with the power train so as to couple the motor to the power train upon pivotal movement of the arm to the lowered position, and so as to uncouple the motor from the power train upon pivotal movement of the arm from the lowered position, an improvement wherein the apparatus comprises (h) a latching and pivoting mechanism, which connects the arm to the console, which comprises a first means latching automatically so as to prevent relative movement of the arm and the console, until the first means is unlatched, upon pivotal movement of the arm either to the lowered position or to the raised position, and so as to prevent relative movement of the arm and the console except for pivotal movement of the arm, until the first means is unlatched, upon pivotal movement of the arm to a pivotal position between the lowered position and the raised position, and which comprises a second means being arranged to be actuated manually and unlatching the first means when actuated manually so as to permit pivotal movement of the arm from any pivotal position, and so as to permit the arm to be removed from the console upon further movement of the arm from the raised position, in a sense opposite to pivotal movement of the arm from the raised position toward the lowered position.

2. In a food-mixing apparatus comprising (a) a console, which has a transverse portion and an upright portion, (b) a mixing bowl, which is supported on the transverse portion, (c) a motor, which is mounted in the console, (d) an arm, which is mounted pivotally to the upright portion, for pivotal movement through positions including a lowered position, wherein the arm extends transversely over the mixing bowl supported on the transverse portion, and a raised position, (e) a mixing tool, which is mounted operatively to the arm, (f) a power train, which is carried by the arm so as to be coupled to the mixing tool mounted operatively to the arm, and (g) a coupler, which is coupled to the motor, and which cooperates with the power train so as to couple the motor to the power train upon pivotal movement of the arm to the lowered position, and so as to uncouple the motor from the power train upon pivotal movement of the arm from the lowered position, an improvement wherein the apparatus comprises (h) a latching and pivoting mechanism, which is adapted to be latched automatically so as to prevent relative movement of the arm and the console upon pivotal movement of the arm either to the lowered position or to the raised position, and so as to prevent relative movement of the arm and the console, except for pivotal movement of the arm, upon pivotal movement of the arm to a pivotal position between the lowered position and the raised position, and which is adapted to be unlatched manually so as to permit pivotal movement of the arm from any pivotal position, and so as to permit the arm to be removed from the console upon further movement of the arm from the raised position, in a sense opposite to pivotal movement of the arm from the raised position toward the lowered position, wherein the upright portion of the console has a recess, wherein the arm has a flanged portion, which fits into the recess in the upright portion of the console when the arm is mounted pivotally to the upright portion of the console, and wherein the latching and pivoting mechanism comprises parallel ways, which are provided on opposite sides of the recess, and parallel pivots, which extend laterally from the flanged portion of the arm into respective ones of the ways when the arm is mounted pivotally to the upright portion of the console, each of the ways having a mouth, through which one of the pivots can pass, and each of the ways having an upper, horizontal edge, and inner, vertical edge, and a lower, cupped edge defining a cup, within which one of the pivots is disposed upon pivotal movement of the arm to the lowered position.

3. The improvement of claim 2 wherein the latching and pivoting mechanism comprises a link, which depends from the arm when the arm is disposed in the lowered position, which is movable along the arm in a locking direction and an unlocking direction, and which is biased in the locking direction, and a pin, which extends laterally from the link, and wherein the recess is provided on one of said sides with a lower notch and an upper notch, the lower notch being disposed to receive the pin, upon pivotal movement of the arm to the lowered position, so as to prevent pivotal movement of the arm from the lowered position while the pin remains in the lower notch, the upper notch being disposed to receive the pin, upon pivotal movement of the arm to the raised position, so as to prevent pivotal movement of the arm from the raised position while the pin remains in the upper notch.

4. The improvement of claim 3 wherein the latching and pivoting mechanism comprises a post, which extends upwardly from the upright portion of the console so as to extend into the arm when the arm is disposed in its lowered position, and which has a notch, and a latching plate, which is movable conjointly with the link within the arm, and which has a hooked portion adapted to be engaged in the notch of the post, upon pivotal movement of the arm to the lowered position, so as to prevent pivotal movement of the arm from the lowered position.

5. The improvement of claim 2 wherein the latching and pivoting mechanism comprises a pair of similar links, which depend from the arm when the arm is disposed in the lowered position, which are movable along the arm in a locking direction and an unlocking direction, and which are biased in the locking direction, and a pair of similar pins, which extend laterally from respective ones of the links, and wherein the recess is provided on each side with a lower notch and an upper notch, the lower notches being disposed to receive the pins, upon pivotal movement of the arm to the lowered position, so as to prevent pivotal movement of the arm from the lowered position while the pins remain in the lower notches, the upper notches being disposed to receive the pins, upon pivotal movement of the arm to the raised position, so as to prevent pivotal movement of the arm from the raised position while the pins remain in the upper notches.

6. The improvement of claim 5 wherein the latching and pivoting mechanism comprises a pair of similar posts, which extend upwardly from the upright portion of the console so as to extend into the arm when the arm is disposed in the lowered position, and which have respective notches, and a latching plate, which is movable conjointly with the links, and which has respective hooked portions adapted to be engaged in the notches of the posts, upon pivotal movement of the arm to the lowered position, so as to prevent pivotal movement of the arm from the lowered position.

7. The improvement of any one of claims 3 through 6 wherein the ways and the lower and upper notches are defined by slotted portions of vertical plates, which are disposed within the recess.

8. The improvement of claim 7 wherein the plates with slotted portions are integral parts of a bracket, which is disposed within the recess.

9. The improvement of claim 7 wherein each pivot comprises a pair of parallel pins extending laterally from the flanged portion of the arm, one pin of each pivot being disposed above another pin of such pivot when the arm is disposed in the lowered position.

10. The improvement of claim 9 wherein the plates with slotted portions are integral parts of a bracket, which is disposed within the recess.

11. The improvement of claim 4 wherein the latching and pivoting mechanism comprises a button, which is mounted operatively to the arm, which is biased outwardly, and which is linked to the latching plate and the link so as to unlatch the latching and pivoting mechanism when the button is pushed inwardly.

12. The improvement of claim 6 wherein the latching and pivoting mechanism comprises a button, which is mounted operatively to the arm, which is biased outwardly, and which is linked to the latching plate and the links so as to unlatch the latching and pivoting mechanism when the button is pushed inwardly.

13. The improvement of claim 11 or 12 wherein the ways and the lower and upper notches are defined by slotted portions of vertical plates, which are disposed within the recess.

14. The improvement of claim 13 wherein the plates with slotted portions are integral parts of a bracket, which is disposed within the recess.

15. The improvement of claim 13 wherein each pivot comprises a pair of parallel pins extending laterally from the flanged portion of the arm, one pin of each pivot being disposed above another pin of such pivot upon pivotal movement of the arm to the lowered position.

16. The improvement of claim 15 wherein the plates with slotted portions are integral parts of a bracket, which is disposed within the recess.

* * * * *